US006184915B1

United States Patent
Atsumi et al.

(10) Patent No.: US 6,184,915 B1
(45) Date of Patent: Feb. 6, 2001

(54) IMAGE PROCESSING APPARATUS AND METHOD

(75) Inventors: Tetsuya Atsumi, Susono; Nobuatsu Sasanuma, Mishima; Yuichi Ikeda, Numazu; Yasuhiro Saito, Susono, all of (JP)

(73) Assignee: Canon Kabushiki Kaisha, Tokyo (JP)

( * ) Notice: Under 35 U.S.C. 154(b), the term of this patent shall be extended for 0 days.

(21) Appl. No.: 08/890,648

(22) Filed: Jul. 9, 1997

(30) Foreign Application Priority Data

Jul. 12, 1996 (JP) .................................................. 8-183784

(51) Int. Cl.[7] ........................................................ B41J 2/47
(52) U.S. Cl. .......................... 347/251; 347/240; 347/247; 358/298; 358/504; 358/534
(58) Field of Search ..................................... 347/240, 247, 347/251; 358/501, 504, 518, 521, 523, 525, 530, 534, 298, 497, 456, 428

(56) References Cited

U.S. PATENT DOCUMENTS

| 4,888,636 | 12/1989 | Abe .......................................... 358/80 |
| 4,959,669 | 9/1990 | Haneda et al. ........................ 347/115 |
| 5,053,866 | 10/1991 | Johnson ................................. 358/75 |
| 5,060,059 | 10/1991 | Mori et al. ............................. 358/79 |
| 5,107,332 | 4/1992 | Chan ....................................... 358/80 |
| 5,136,371 | 8/1992 | Savatier et al. ....................... 358/133 |
| 5,142,356 | 8/1992 | Usami et al. ........................... 358/80 |
| 5,166,786 | 11/1992 | Sakai et al. ............................. 358/76 |
| 5,172,224 | 12/1992 | Collette et al. ......................... 358/80 |
| 5,175,633 | 12/1992 | Saito et al. ............................. 358/406 |
| 5,191,361 | 3/1993 | Abe ....................................... 347/116 |
| 5,229,864 | 7/1993 | Moronaga et al. .................... 358/433 |
| 5,237,401 | 8/1993 | Koike et al. ............................ 358/518 |
| 5,258,783 | 11/1993 | Sasanuma et al. .................... 347/115 |
| 5,331,441 | 7/1994 | Akuzawa et al. ...................... 358/530 |
| 5,379,126 | 1/1995 | Seto et al. ............................. 358/456 |
| 5,386,302 | 1/1995 | Kashihara et al. .................... 358/448 |
| 5,414,531 | 5/1995 | Amemiya et al. ..................... 358/465 |
| 5,434,645 | 7/1995 | Usami ................................... 355/38 |
| 5,446,550 | 8/1995 | Maekawa et al. .................... 358/298 |
| 5,463,700 | 10/1995 | Nakazawa ............................. 382/232 |
| 5,489,998 | 2/1996 | Yamada et al. ....................... 358/523 |
| 5,566,372 | 10/1996 | Ikeda et al. ............................ 399/46 |
| 5,572,330 | 11/1996 | Sasanuma ............................. 358/302 |
| 5,608,549 | 3/1997 | Usami ................................... 358/530 |

FOREIGN PATENT DOCUMENTS 61-248668  11/1986  (JP) ................................ H04N/1/40

Primary Examiner—N. Le
Assistant Examiner—Hai C. Pham
(74) Attorney, Agent, or Firm—Fitzpatrick, Cella, Harper & Scinto

(57) ABSTRACT

An image forming apparatus forms an image on a medium by using an output device. A pattern signal for forming a predetermined pattern image on the medium is generated, and image forming parameters for the output device are determined on the basis of the density of the pattern image formed on the medium. The determined image forming parameters are transmitted via bidirectional communication to an external computer or other image forming apparatus.

25 Claims, 18 Drawing Sheets

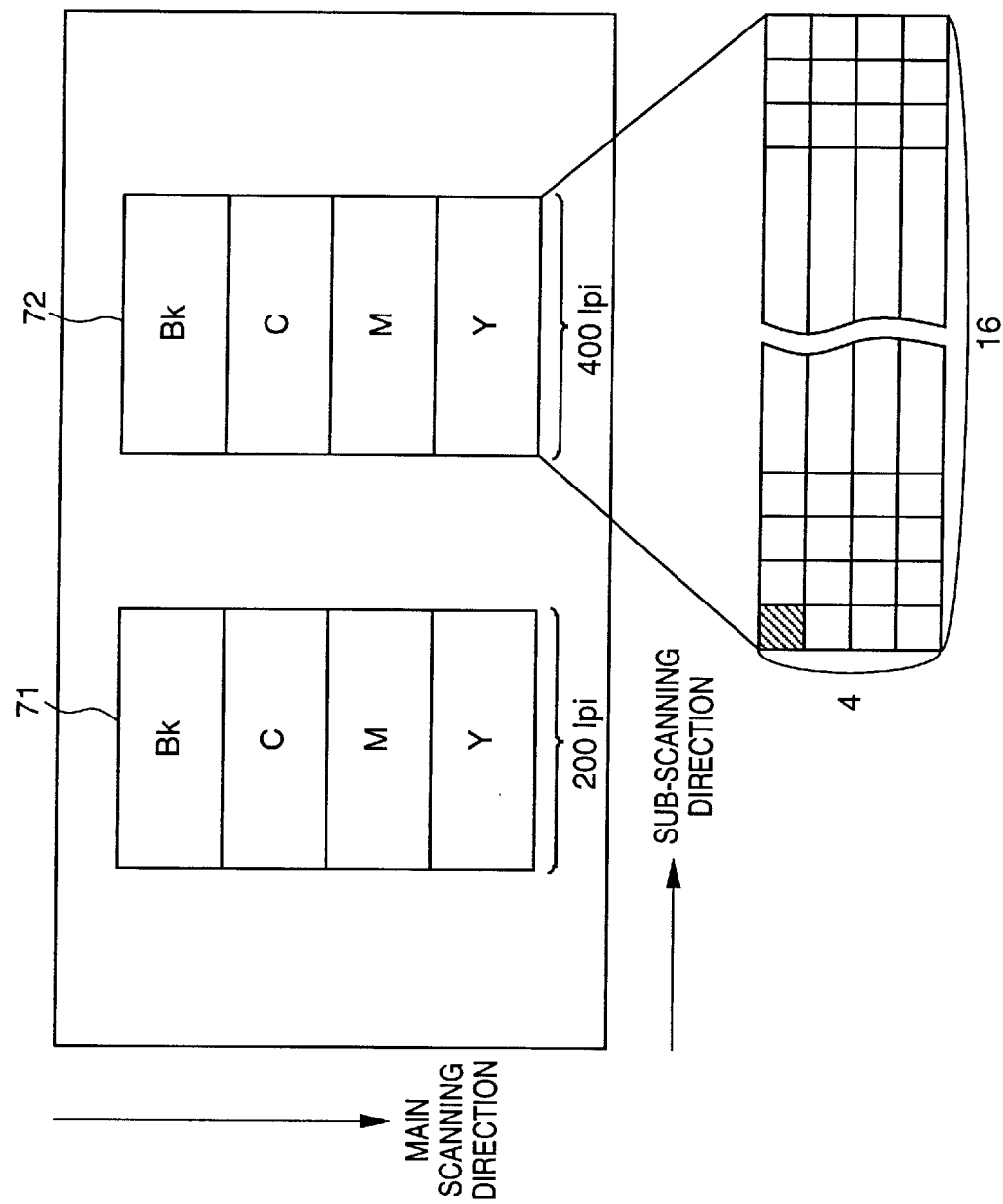

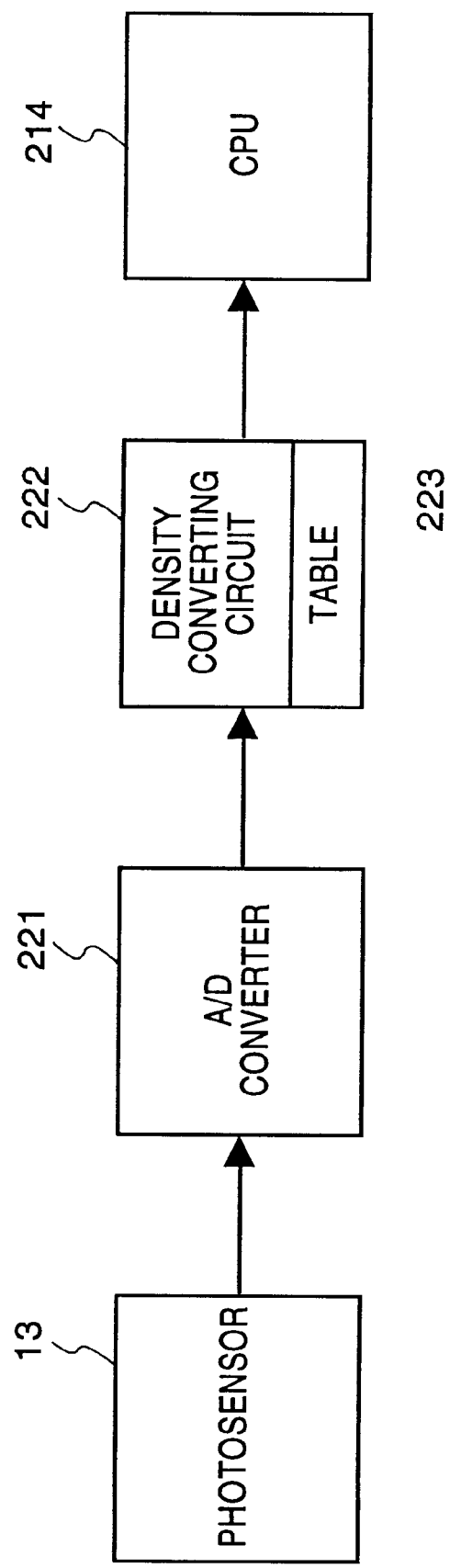

ELECTROSTATIC DRUM 1

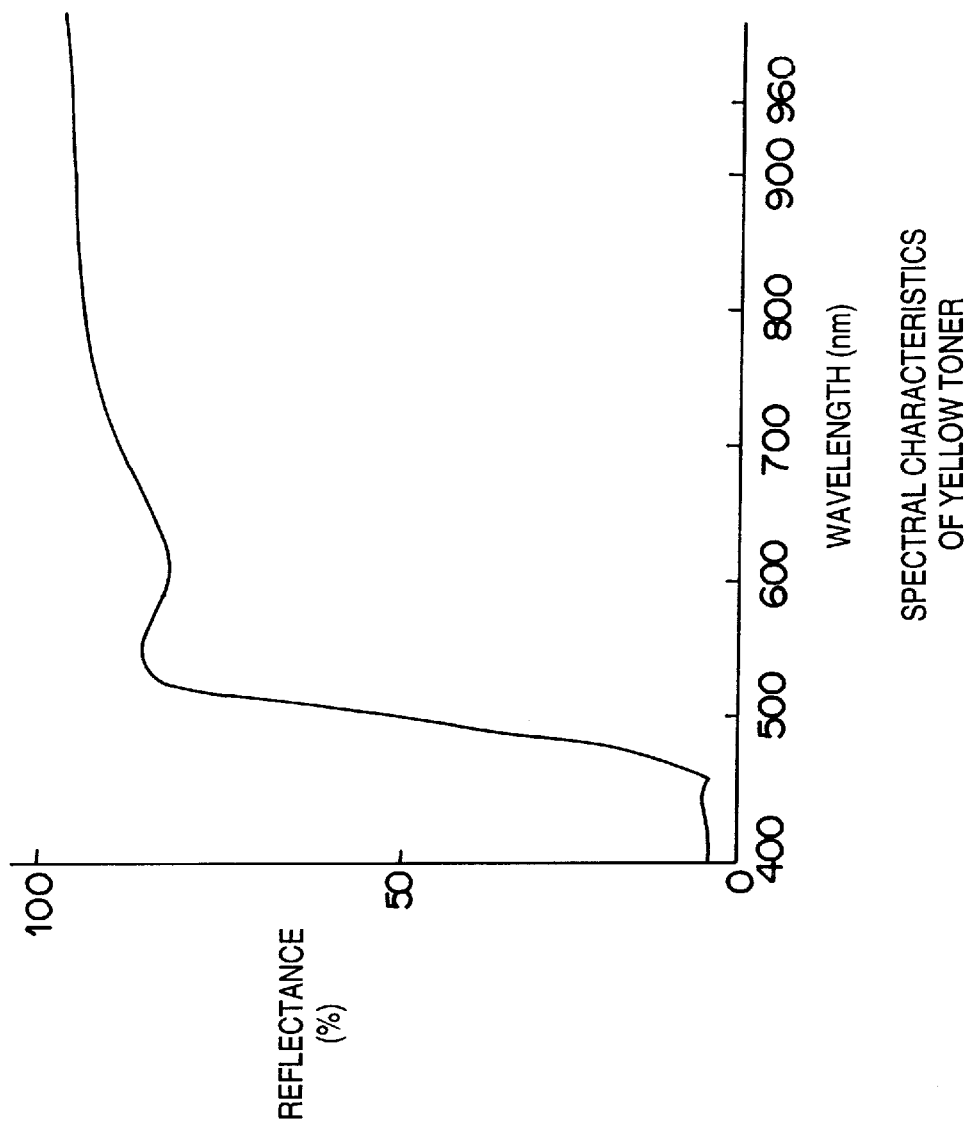

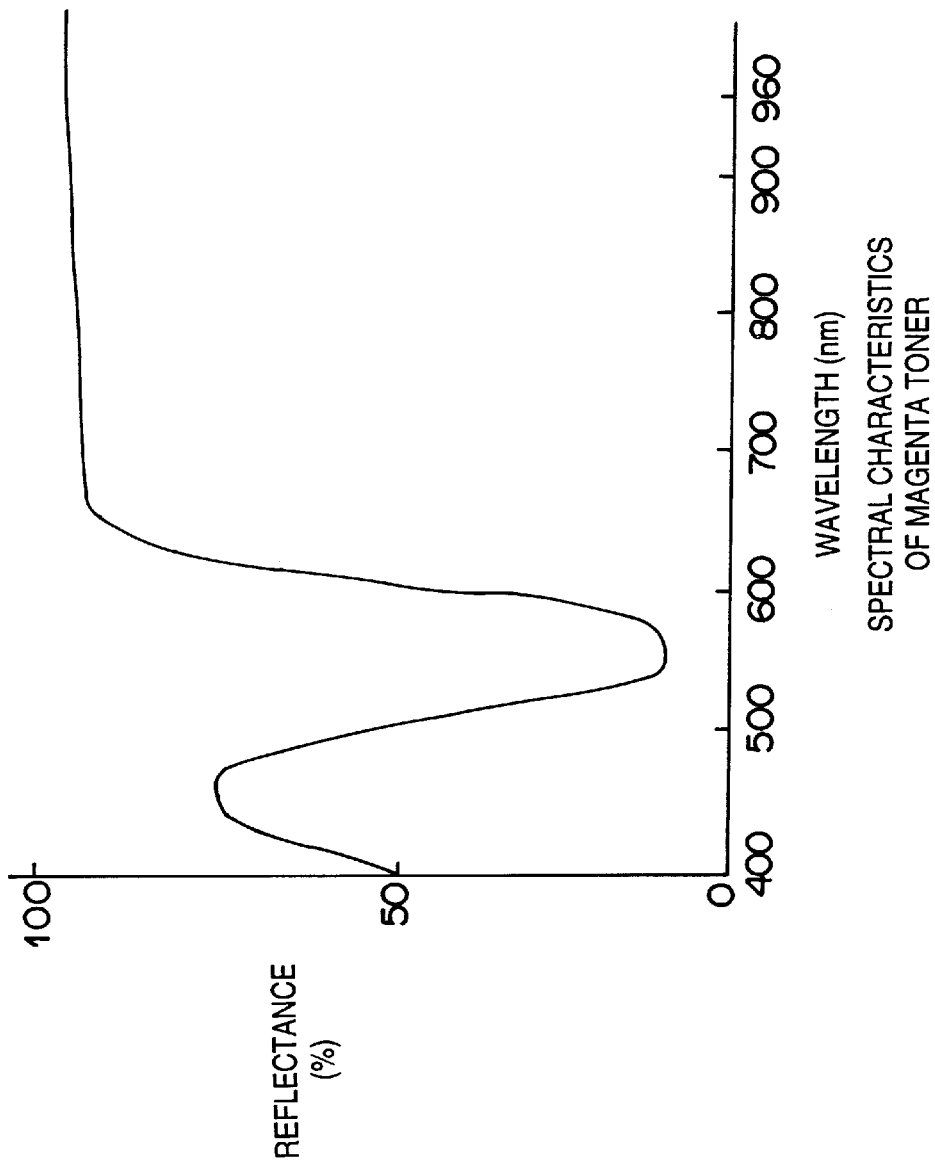

IMAGE PROCESSING APPARATUS AND METHOD

BACKGROUND OF THE INVENTION

The present invention relates to an image processing apparatus having a function for compensating for characteristics of an output device and an image processing method.

Recently, a color image forming apparatus which forms a color image on a recording medium on the basis of information of a color original image displayed on a color CRT display has been used in computerized offices. As examples of color image forming apparatuses, there are a copying machine and a printer adopting an electrophotographic method. Such copying machine and printer have excellent color reproduction, therefore, they are widely used in a field which requires faithful color reproduction of an original image, such as the field of designing and the field of image processing.

Further, the color gamut in chromaticness and lightness of an original image displayed on a color CRT display generally does not match the color gamut of a printed image formed by the above image forming apparatuses. Therefore, in order to match the color gamut of a color image inputted to a color image forming apparatus to the color gamut of an output color image, several techniques have been suggested. According to one technique, a test pattern which is outputted from a color image forming apparatus is read,-And characteristics of the image forming apparatus are compensated for. According to another technique, when the color gamut of an input color image signal is broader than that of a color image forming apparatus, the color gamut of the input color image signal is compressed within the color gamut of the image forming apparatus. By using the above techniques, an attempt is made to faithfully reproduce an original image.

There is no problem in a case where a single color image forming apparatus for outputting an image is used, however, a problem exists when a plurality of color image forming apparatuses are connected to a single computer by a computer network system. In such a network system, when an image is outputted from the plurality of color image forming apparatuses, each of the plurality of color image forming apparatuses may independently adjusted its output characteristics, however, the color image forming apparatuses may not be adjusted to each other and the computer. As a result, the plurality of color image forming apparatuses may form images having different color gamuts from each other.

Further, since an external device, such as a computer, can not determine the output characteristics of an image forming apparatus, there is a problem such that image processing suitable for the output characteristics of the image forming apparatus to be used is not performed.

SUMMARY OF THE INVENTION

The present invention has been made in consideration of the above situation, and has as its object to provide an image processing apparatus and method capable of providing parameters representing output characteristics of an image forming apparatus to an external device.

According to the present invention, the foregoing object is attained by providing an image processing apparatus for an output device which forms an image, the processing apparatus comprising: generation means for generating a pattern signal for forming a predetermined pattern image on a medium; determination means for determining an image forming parameter for the output device on the basis of density of the pattern image formed on the medium; and communication means for outputting the determined image forming parameter to an external computer, the communication means being capable of performing bidirectional communication.

According to the present invention, the foregoing object is also attained by providing an image processing method for an output device which forms an image, the method comprising: a generation step of generating a pattern signal for forming a predetermined pattern image on a medium; a determination step of determining an image forming parameter for the output device on the basis of density of the pattern image formed on the medium; and a communication step of performing bidirectional communication for outputting the determined image forming parameter to an external computer.

It is another object of the present invention to improve the calibration function of an output device of an image processing apparatus.

It is still another object of the present invention to improve efficiency of calibration processing of an output device of an image processing apparatus in a network system.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a view showing a tone pattern used for tone correction;

FIG. 10 is a block diagram illustrating a signal processing system including a photosensor in an apparatus according to a second embodiment;

FIG. 14 is a graph showing spectral characteristics of a yellow toner;

FIG. 15 is a graph showing spectral characteristics of a magenta toner;

DETAILED DESCRIPTION OF THE PREFERRED EMBODIMENTS

Preferred embodiments of the present invention will be described in detail in accordance with the accompanying drawings.

<First Embodiment>

First, an overall configuration of an image forming apparatus according to the first embodiment is explained. Note, in the first embodiment, a case where the present invention is applied to a digital copying machine adopting an electrophotographic method is explained, however, the present invention is not limited to this, and is also applicable to image forming apparatuses adopting a variety of methods, such as an electrostatic printing method and ink-jet printing method.

(Configuration of an Image Forming Apparatus)

Figure 1:
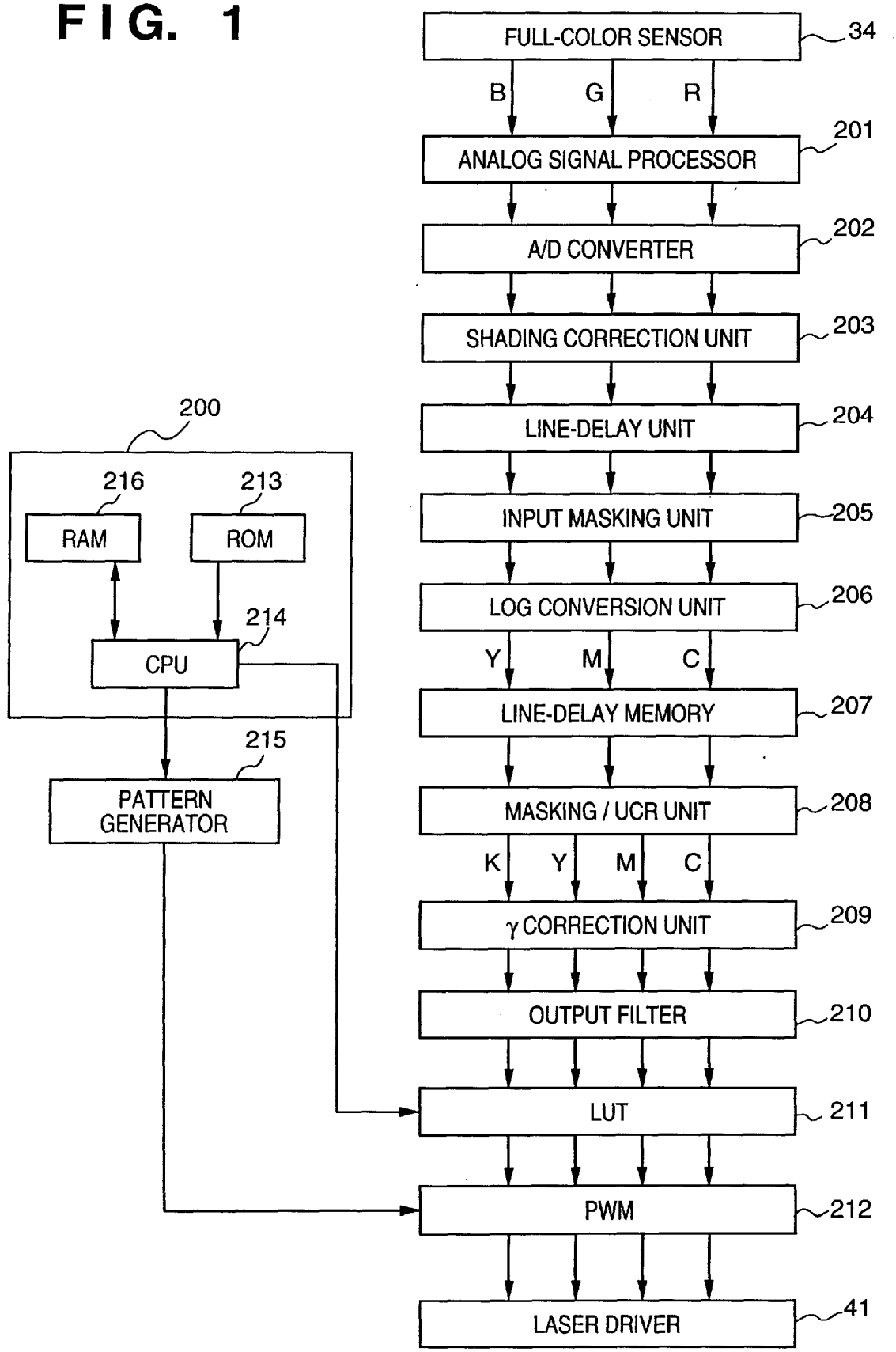
FIG. 1 is a block diagram illustrating a configuration of an optical system and an image processing system in an image forming apparatus according to an embodiment of the present invention.
Figure 2:
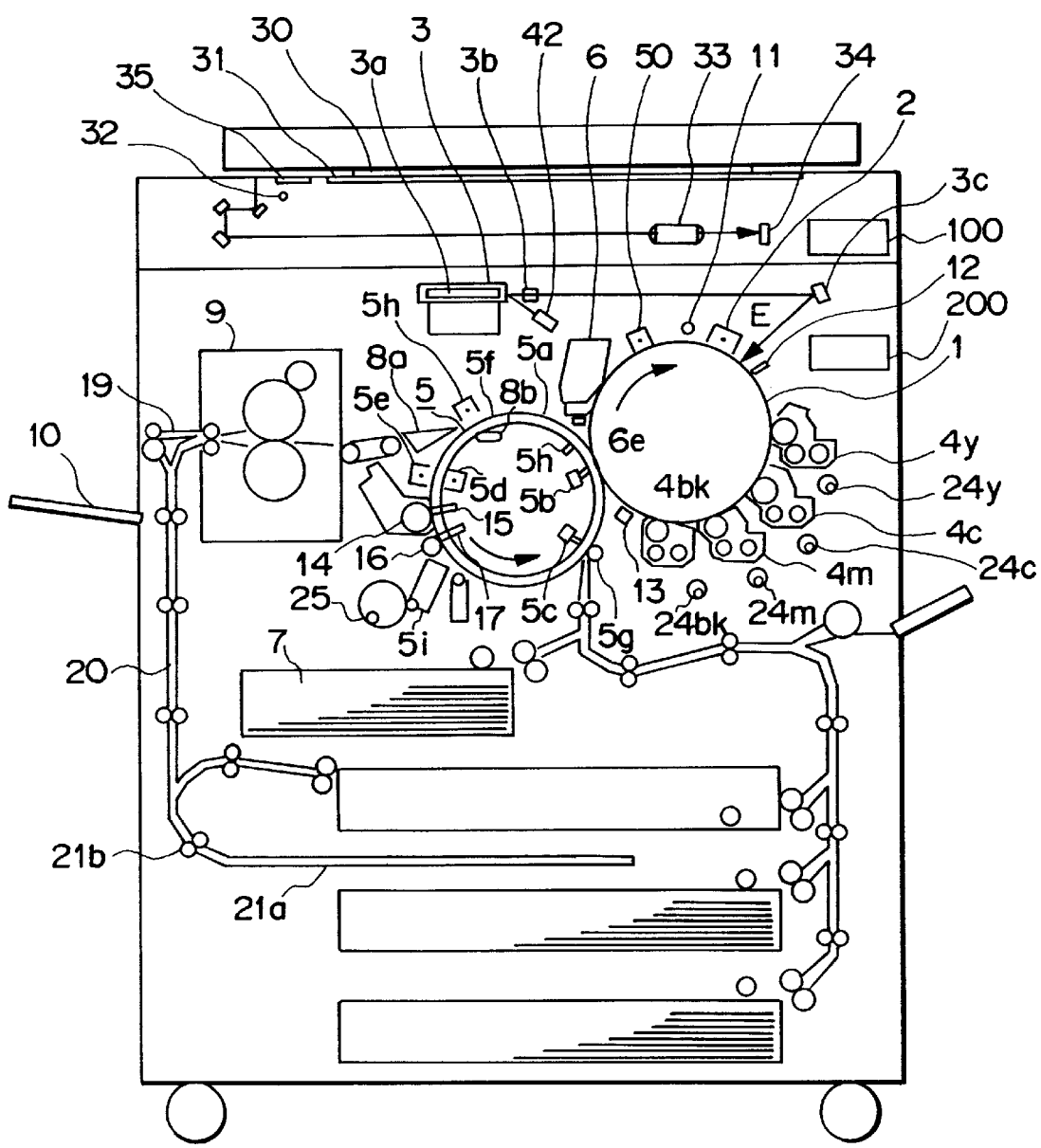
FIG. 2 is a schematic cross-sectional view of an image forming apparatus according to a first embodiment.

FIG. 1 is a block diagram illustrating a configuration of the image forming apparatus according to the first embodiment of the present invention, and FIG. 2 is a schematic cross-sectional view of the image forming apparatus. The configuration of the image forming apparatus and image forming processes in the image forming apparatus are explained in detail below.

The digital copying machine shown in FIG. 2 includes a reading unit for reading an original image and a printing unit for reproducing the original image on a recording paper sheet, which is as a recording medium, on the basis of image signals of the original image read by the reading unit. The operation of the reading unit and the printing unit which will be explained below is controlled by controllers 100 and 200, respectively. Note, the controller 100 has a CPU (not shown) and controls the reading unit in accordance with a program stored in advance in a ROM, or the like. Further, the controller 200 includes a CPU 214 as shown in FIG. 1, and controls the printing unit in accordance with a program stored in advance in ROM 213.

In the apparatus shown in FIG. 2, when a copy key (not shown) is pressed by an operator, the controller 100 controls the reading unit so that an exposure lamp 32 emits light to scan an original 30 placed on a platen glass 31. The reflected light from the original 31 is directed to a full-color sensor 34, such as a CCD (charge-coupled device), to obtain color component image signals. The full-color sensor 34 decomposes an image of the original 30 into a number of pixels, and generates signals, obtained by photoelectric conversion, corresponding to the density of each pixel.

Referring to FIG. 1, image signals (red, green and blue (referred as "R, G and B", hereinafter) analog signals) outputted from the full-color sensor 34 are inputted to an analog signal processor 201 where gain and offset of the image signals are adjusted. Thereafter, the image signals are converted into R, G and B digital signals of eight bits (each 0 to 255 levels, capable of expressing 256 tones), for example, by an analog-digital (A/D) converter 202 for each color component. Then, a shading correction unit 203 performs a known shading correction for each color component for optimizing gain in correspondence with each cell of a CCD sensor (referred as "CCD sensor cell", hereinafter), arranged in a line, on the basis of signals of a reference white board 35 in order to correct unevenness in sensitivity of CCD sensor cells.

A line-delay unit 204 corrects the spatial gap included in the image signals outputted from the shading correction unit 203. The spatial gap is due to the arrangement of line sensors of the full-color sensor 34, that is, the line sensors are separated from each other at a predetermined distance in the sub-scanning direction. More specifically, the line-delay unit 204 delays R and G component signals by line in the sub-scanning direction with respect to a B component signal, thereby synchronizing the phase of the three color component signals.

An input masking unit 205 transforms the color space of the image signals outputted from the line-delay unit 204 into an NTSC standard color space by performing the matrix operation shown in the following equation (1). In other words, a color space of the color component signals outputted from the full-color sensor 34 is determined by the spectral characteristics of a filter of each color component, and the color space is then transformed into the NTSC standard color space.

$$\begin{pmatrix} R0 \\ G0 \\ B0 \end{pmatrix} = \begin{pmatrix} a11 & a12 & a13 \\ a21 & a22 & a23 \\ a31 & a32 & a33 \end{pmatrix} \begin{pmatrix} Ri \\ Gi \\ Bi \end{pmatrix} \quad (1)$$

R0, G0 and B0 are image signals outputted from the input masking unit 205, and Ri, Gi and Bi are image signals inputted to the input masking unit 205.

A logarithmic (LOG) conversion unit 206 has a look-up table (LUT) stored in a ROM (not shown), or the like, for example, and converts R, G and B luminance signals outputted from the input masking unit 205 into C, M and Y density signals. A line-delay memory 207 provided next to the LOG conversion unit 206 delays the image signals outputted from the LOG conversion unit 206 for a period (for one line period) in which a black character determination unit (not shown) generates a control signal, UCR, for controlling a masking/under color removal (UCR) unit 208 (will be explained later), a control signal, FILTER, used for edge enhancement, and a control signal, SEN, used for increasing resolution of an image when the black character determination unit determines the image is composed of black characters, for example, from the output of the input masking unit 205.

A masking/under color removal (UCR) unit 208 extracts a black component signal K from the image signals outputted from the line-delay memory 207. Further, it applies a matrix operation to Y, M, C and K image signals in order to correct color haziness of color recording material in the printing unit and outputs frame-sequential color component image signals of eight bits, for example, in the order of M, C, Y and K, each time the reading unit performs a reading operation. Note, matrix coefficients used in the matrix operation are set by the CPU 214 in the controller 200.

A γ correction unit 209 applies density correction on image signals outputted from the masking/UCR unit 208 so as to fit the image signals to ideal toning characteristics of the printing unit. Then, an output filter (spatial filtering unit) 210 performs edge enhancement or smoothing processing on the image signals outputted from the γ correction unit 209 in accordance with control signals from the CPU 214.

A look-up table (LUT) 211 is used for matching the density of an original image and the density of an output image. It is stored in a RAM (not shown), or the like, for example, and data of the LUT 211 by the CPU 214 (details will be explained later). Further, a pulsewidth modulator (PWM) 212 outputs a pulse signal having a pulsewidth corresponding to a level of an input image signal, and the pulse signal is inputted to a laser driver 41 which drives a laser emitter 42, such as a semi-conductor laser (refer to FIG. 2).

Note, the image forming apparatus has a pattern generator 215, and can directly pass the image signals corresponding to a predetermined pattern image, which will be explained later, on the basis of data stored in the ROM 213 in advance, to the pulsewidth modulator 212 (details will be explained later).

Referring to FIG. 2, a laser beam E emitted from the laser emitter 42 is directed by a rotating polygon mirror 3a so as to sweep an electrostatic drum 1 in the main scanning direction, passes through a lens 3b, such as a f/θ lens, then is reflected by a fixed mirror 3c which is used for directing the laser beam E toward the electrostatic drum 1 where the laser beam E makes a light spot. Thereby, the laser beam E scans the electrostatic drum 1 in a direction approximately parallel to a rotation axis of the electrostatic drum 1 (i.e., main scanning direction), and repeats scanning the electrostatic drum 1 in the main scanning direction by shifting in the direction of rotation of the electrostatic drum (i.e., sub-scanning direction), thereby forming a latent image on the electrostatic drum 1.

In the printing unit, the electrostatic drum 1 on which a latent image and a toner image are formed has amorphous silicon, selenium, organic photo conductor (OPC), and so on, on its surface, and is supported so as to freely rotate in the direction of an arrow shown in FIG. 2. Around the electrostatic drum 1, a pre-exposure lamp 11, a corona charger 2 as a charging means, a laser exposing optical system 3, a surface potential sensor 12, four developing units, 4y, 4c, 4m and 4bk, having different color recording materials, a photo sensor 13 as a quantity-of-light detecting means for the electrostatic drum, a transfer unit 5, and a cleaning unit 6 are provided.

In the printing unit, the controller 200 controls the electrostatic drum 1 to rotate in the direction of the arrow when forming an image. After charges on the electrostatic drum 1 are uniformly removed by using the pre-exposure lamp 11, the electrostatic drum 1 is uniformly charged by the corona charger 2. Thereafter, the electrostatic drum 1 is scanned and exposed by the laser beam E which is generated in accordance with the image signals in PWM 212, thereby a latent image corresponding to the image signals is formed on the electrostatic drum 1.

Next, the controller 200 operates a predetermined developing unit to reversal-develop the latent image formed on the electrostatic drum 1 by using a double-component developer consisting of toner and carrier. Accordingly, a visible image (toner image) of resin as a base substance which is charged to negative is formed. Here, a controller 200 controls eccentric cams, 24y, 24c, 24m and 24bk, so that the four developing units 4y, 4c, 4m and 4bk approach the electrostatic drum one by one in accordance with signals of the color to be developed. Note, "reversal-develop" indicates a developing method for visualizing a latent image by clinging a toner, charged to the same polarity as that of the latent image, to an area on the electrostatic drum 1 exposed by light (laser beam E).

Further, the toner image on the electrostatic drum 1 is transferred onto a recording medium provided by a conveying system 250 from a recording medium feed tray 7 at a position facing to the electrostatic drum 1 by the transfer unit 5. The transfer unit 5 has a transfer drum 5a for conveying a recording medium, a brush transfer charger 5b as transfer means, a brush attracting charger 5c and an attracting roller 5g facing the brush attracting charger 5c for electrostatically attracting the recording medium, an inner charger 5d, an outer charger 5e, and a transfer separation sensor 5h. Further, a recording medium holding sheet 5f, made of a dielectric, having a cylindrical shape is integrally put around the lateral face of the transfer drum 5a supported by an axis so as to be operated to rotate. Note, a dielectric sheet, such as a polycarbonate sheet, is used as the recording medium holding sheet 5f.

In the transfer unit 5, as the controller 200 controls the transfer drum 5a to rotate, the toner image on the electrostatic drum 1 is transferred onto the recording medium, held by the recording medium holding sheet 5f, by the brush transfer charger 5b. Then, after toner images of a desired numbers of colors are transferred on the recording medium, the recording medium is separated from the transfer drum 5a by a claw separator 8a, a separation push-up roller 8b, and a separation charger 5h. The toner image on the separated recording medium is fixed by a thermal roller fixing device 9, then the recording medium is discharged to a tray 10, thereby a full-color image is provided.

Meanwhile, after a toner image is transferred from the electrostatic drum 1, residual toner on its surface is cleaned by the cleaning unit 6 having a cleaning blade and a raked gear sheet, and the electrostatic drum 1 serves the next image forming processes. Further, in order to prevent toner from scattering and clinging to the recording medium holding sheet 5f on the transfer drum 5a and to prevent oil from clinging on a recording medium, the transfer drum 5a is cleaned by a cleaning brush 14 and a back-up brush 15 which faces the cleaning brush 14 via the recording medium holding sheet. Such cleaning is performed before or after image forming processing, and whenever jamming occurs.

(Maximum Density Correction Processing and Tone Correction Processing)

Next, maximum density correction processing and tone correction processing performed in the reading unit and the printing unit are explained with reference to the flowchart shown in FIG. 3. These processings are performed as a calibration function (self-adjusting function) of the image forming apparatus.

Figure 3:
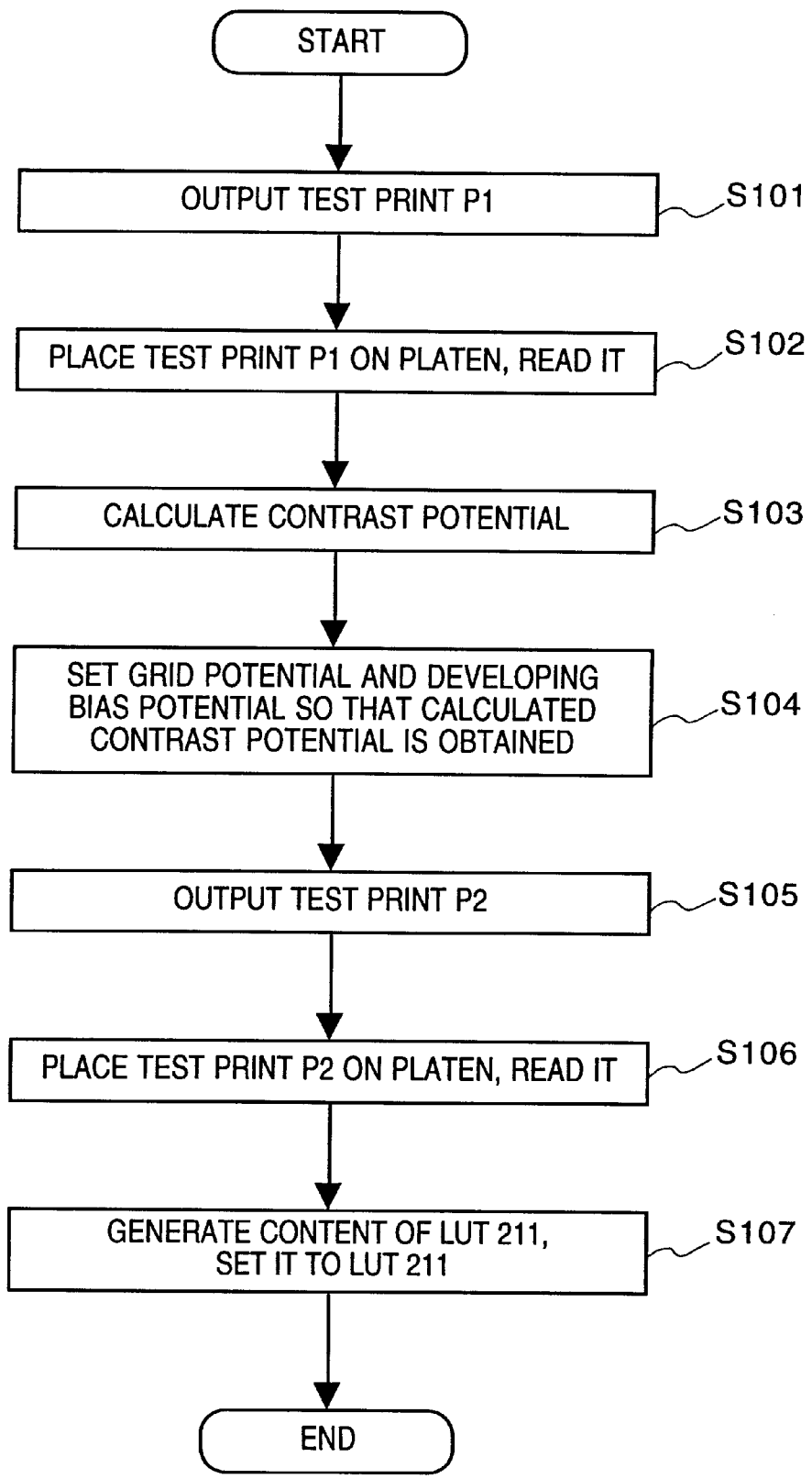
FIG. 3 is a flowchart showing a processing sequence of maximum density correction and tone correction according to the first embodiment.

FIG. 3 is a flowchart showing a sequence of maximum density correction processing and tone correction processing performed in the image forming apparatus according to the first embodiment. Referring to FIG. 3, after the processing starts in response to an operation by an operator, a test print P1 on which a predetermined pattern image (test pattern image I1) is formed is outputted at step S101 by performing the image forming processes described above.

Figure 4:
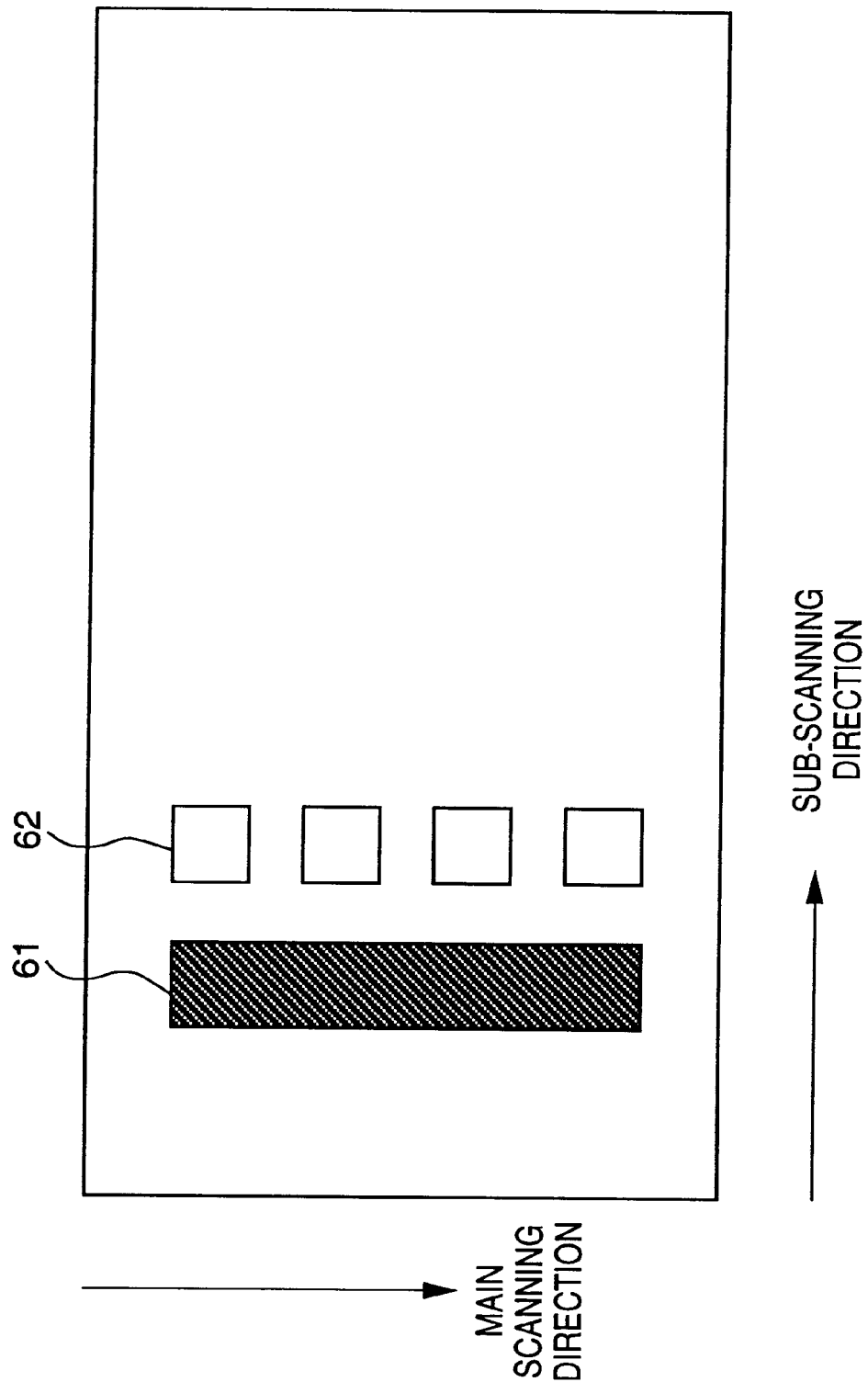
FIG. 4 is a view showing a patch pattern used for the maximum density correction.

The test pattern image I1 was registered in the ROM 213 in advance, and the pattern generator 215 generates image signals corresponding to the test pattern image I1 under control of the CPU 214. Then, the image signals are processed by the PWM 212 and the laser driver 41 drives the laser emitter 42 in accordance with the processed image signals, as described above, the test pattern image I1 as shown in FIG. 4 is outputted. Note, when the test pattern image I1 shown in FIG. 4 is outputted, the LUT 211 is not used.

At this time, the CPU 214 determines whether or not there is a recording paper sheet which is necessary for outputting the test pattern image I1. If there is not, a predetermined warning message is displayed. Further, as for contrast potential (explained later) when outputting the test print P1, an initial value under predetermined environment (standard state) was registered in advance and used. Regarding the test pattern image I1 (patch pattern), a belt-shape pattern 61 showing half tone densities of yellow (Y), magenta (M), cyan(C) and black (Bk) and a patch pattern 62 showing maximum densities (e.g., image density signal level is 255) of Y, M, C and Bk are formed.

After the output test print P1 is placed on the platen glass 31, the test pattern image I1 is read at step S102, and correction coefficients kc, km, ky and kbk are adjusted so that the obtained values become the same as those of a densitometer on the market by using the following equations (2), for converting the R, G and B values obtained by reading the test pattern image I1 into density values.

$$C=-kc \times \log_{10}(R/255)$$

$$M=-km \times \log_{10}(G/255)$$

$$Y=-ky \times \log_{10}(B/255)$$

$$Bk=-kbk \times \log_{10}(G/255) \quad (2)$$

Next, a method for correcting the maximum reproducible density of the image forming apparatus on the basis of the density information obtained by performing the aforesaid processes will be explained.

Figure 5:
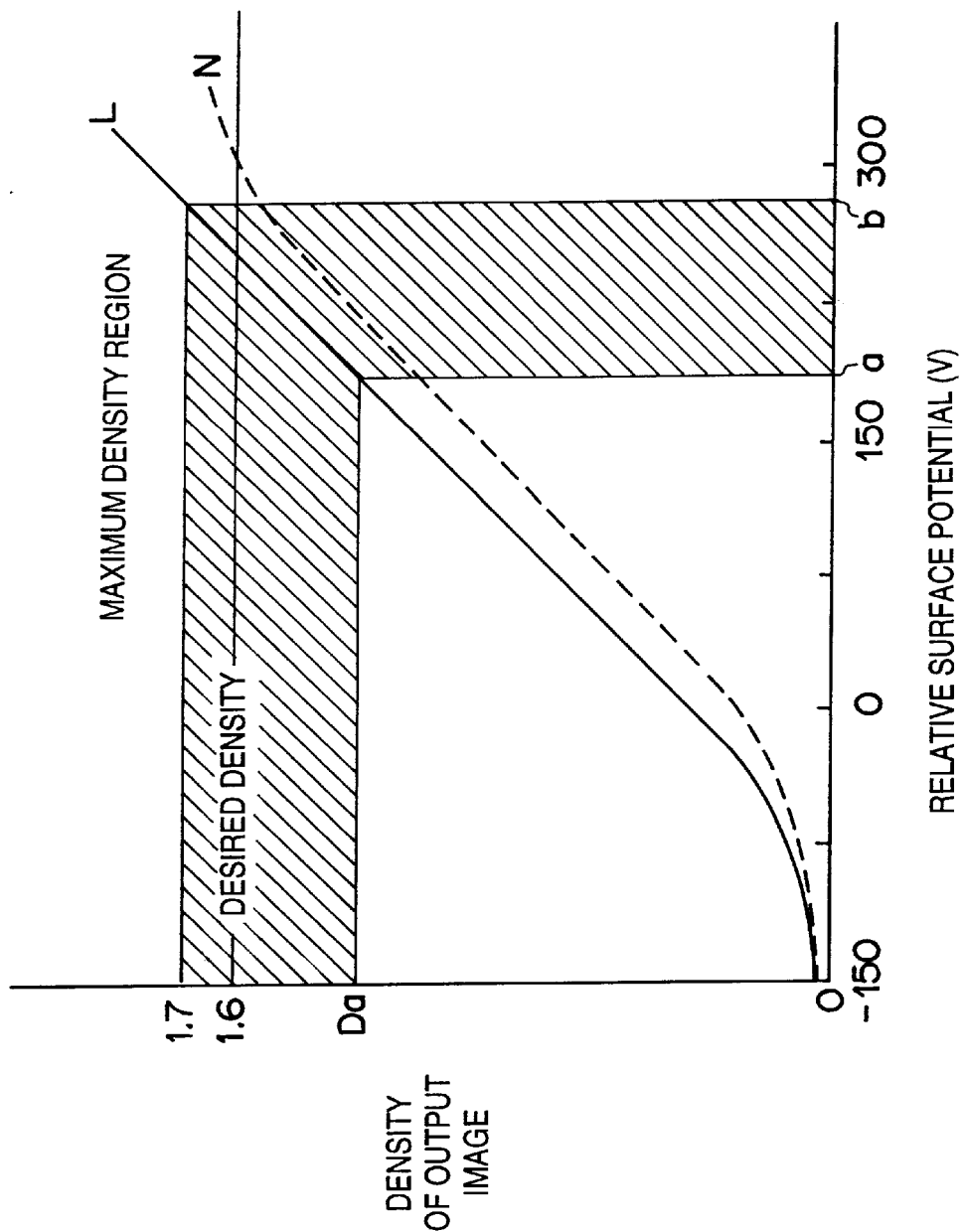
FIG. 5 is a graph showing the relationship between relative potential on the surface of an electrostatic drum and image density.

FIG. 5 is a graph showing the relationship between relative potential of the electrostatic drum surface (referred as "surface relative potential", hereinafter) and the image density obtained in accordance with the aforesaid calculation. Note, the value of the image density shown in FIG. 5 is measured by the Macbeth method. Here, the surface relative potential is the relative potential of the surface of the electrostatic drum 1 after a latent image is formed on it with reference to the potential to be applied to the electrostatic drum 1 when developing a latent image (called "developing bias potential", hereinafter).

Referring to FIG. 5, the potential a shows the contrast potential when the test print 1 is outputted. Note, the contrast potential is a relative potential of the electrostatic drum surface with respect to the developing bias potential when the semi-conductor laser is controlled to emit a laser of the maximum level after the electrostatic drum is primary charged. Here, a case where Da, shown in FIG. 5, is the maximum density obtained when the relative surface potential is the contrast potential $a$ is considered. In the maximum density region shown by oblique stripes in FIG. 5, basically density of an output image linearly changes, as shown by a line L, with respect to the relative surface potential. However, when a double-component developer including toner and carrier is used, in a case where the toner density in the developer decreases, the relationship between the density of the output image and the relative surface potential occasionally becomes non-linear in the maximum density region, as shown by a dotted line N. Therefore, although the desired value of the maximum density of an output image is 1.6 in the first embodiment, 0.1 is added in order to overcome the above non-linear problem, and a value 1.7 is used as the desired value of the maximum density.

A method for calculating a contrast potential of b for obtaining the desired maximum density of 1.7, as shown in FIG. 5, and controlling a grid potential and the developing bias potential so as to make the contrast potential be the calculated value b is explained below.

First the contrast potential $\underline{b}$ is calculated.

In the first embodiment, the contrast potential $\underline{b}$ is calculated in accordance with the following equation (3).

$$b=(a+ka) \times 1.7/Da \quad (3)$$

where ka is a correction coefficient, and preferably is optimized depending upon the developing method (step S103).

Next, a method for obtaining the grid potential and the developing bias potential Vdc for controlling charge on the electrostatic drum 1 on the basis of the contrast potential $\underline{b}$ obtained by the equation (3) is briefly explained. Note, control operation for obtaining the grid potential and the potential of the developing bias is called "potential measuring control" below.

Figure 6:
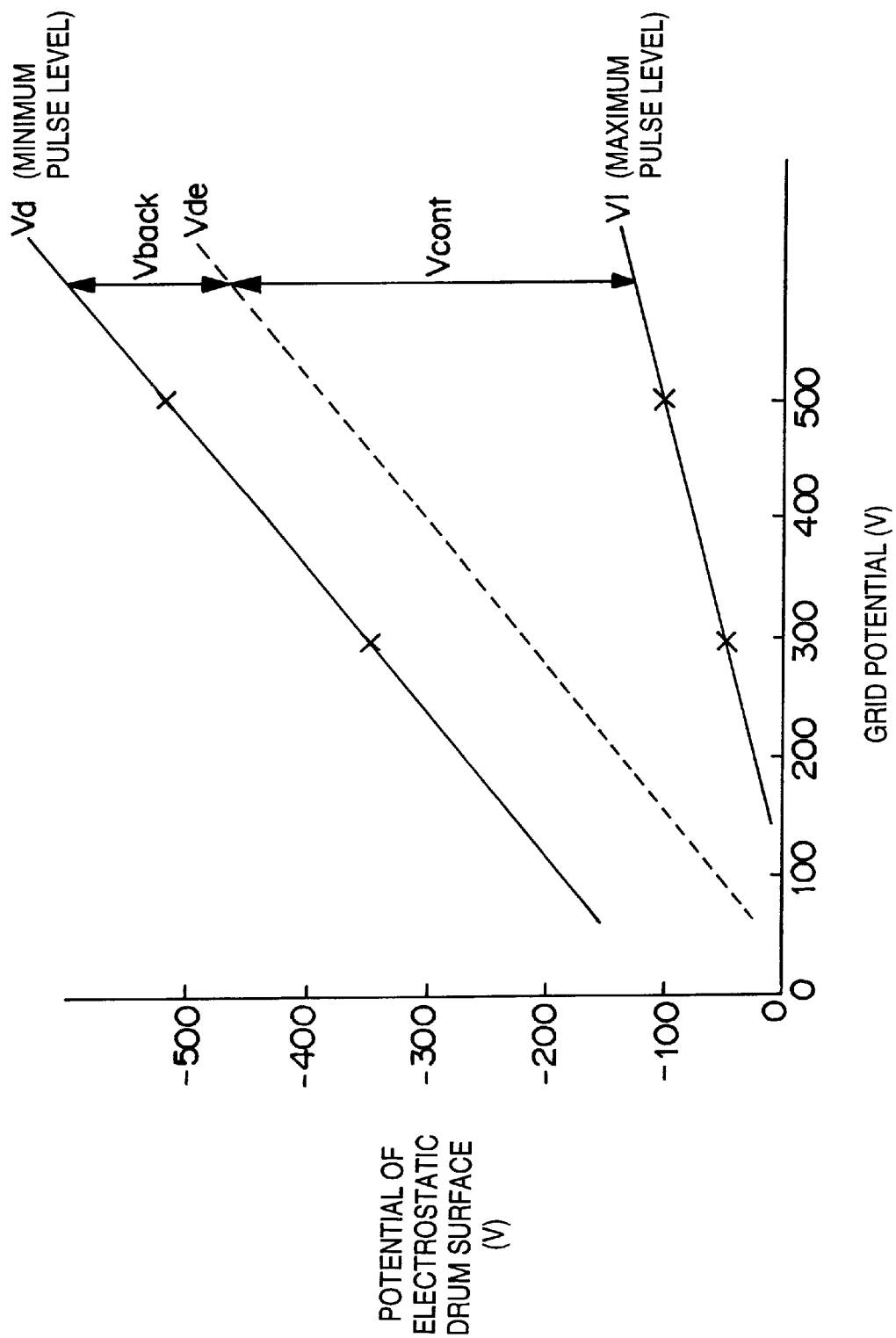
FIG. 6 is a graph showing the relationship between grid potential and the potential on the surface of the electrostatic drum.

FIG. 6 is a graph showing the relationship between the grid potential and the potential on the surface of the electrostatic drum 1. With the grid potential set to −300V, potential Vd on the surface of the electrostatic drum 1 when the electrostatic drum 1 is scanned with a laser beam of the minimum pulse level emitted from the laser emitter 42, and the potential Vl on the surface of the electrostatic drum when the electrostatic drum 1 is scanned with a laser beam of maximum pulse level are measured by the surface potential sensor 12. Similarly, the potentials Vd and Vl are measured when the grid potential is set to −500V. Thereafter, the data obtained when the grid potentials are −300V and −500V is interpolated. Thereby, it is possible to obtain the relationship between the grid potential and the potential on the surface of the electrostatic drum 1.

A developing bias potential Vdc is set to a potential which is different from the potential Vd by a potential difference of Vback (set to 150V in the first embodiment) so that excess toner does not cling to the electrostatic drum 1. Further, a contrast potential Vcont, shown in FIG. 6, indicates the potential difference between the developing bias potential Vdc and the potential Vl, and as the contrast potential Vcont is larger, a larger maximum density can be outputted.

In order to match the contrast potential $\underline{b}$ to the value obtained in accordance with the aforesaid equation (3), the grid potential and the developing bias potential Vdc are to be calculated based on the relationship shown in FIG. 6.

For example, the contrast potential is calculated so that the obtained maximum density of an output image becomes the desired value of 1.7, then the grid potential and the developing bias potential Vdc are set so that the calculated contrast potential is obtained as a result (step S104).

How the LUT 211 and processing sequence of tone correction according to the first embodiment are used is explained below.

Figure 7:
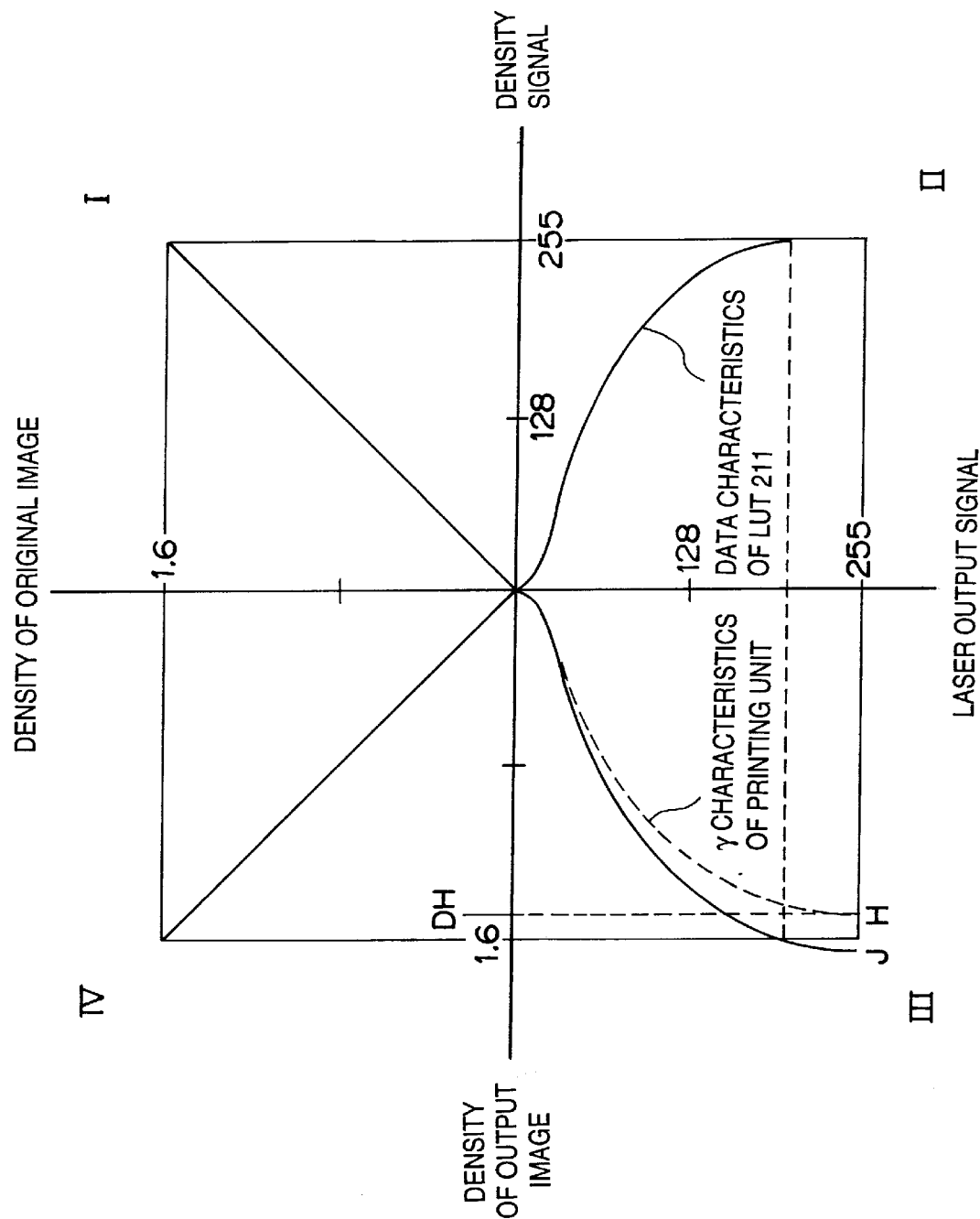
FIG. 7 is a graph showing density characteristic compensation curves.

FIG. 7 is a graph used for compensating output characteristics of the image forming apparatus when reproducing the density of an original image. In FIG. 7, quadrant I shows characteristics of the reading unit for converting density of the original image into a density signal; quadrant II shows characteristics of the LUT 211 for converting the density signal into a laser output signal; quadrant III shows characteristics of density of an image outputted by the printing unit on the basis of the laser output signal; and quadrant IV shows the relationship between the density of the original image and density of the output image. Note, in FIG. 7, the density of original image and density of the output image are measured by the Macbeth method. These characteristics show overall toning characteristics of the image forming apparatus according to the first embodiment.

Note, the number of tones used in the first embodiment is 256, since tone is processed as an eight-bit digital signal. Further, because of the aforesaid maximum density correction processing in which the desired maximum density is set to include an allowance of 0.1 in consideration of a case where toner density in a double-component developer drops, the characteristics of the printing unit shown in the quadrant III is as the curve J. Note, when such allowance is not included, the characteristics of the printing unit may be as shown by a broken line H which does not reach the actually desired density of 1.6. Therefore, if the characteristics of the printing unit is as shown by the broken line H, no matter how the LUT 211 is set, the density between the density DH and the desired value 1.6 is not reproducible, since the LUT 211 does not have an ability of increasing the maximum density of an output image.

In the image forming apparatus according to the first embodiment, non-linear characteristics of the printer unit as shown in the quadrant III are compensated by the LUT 211 whose characteristics are shown in the quadrant II, so as to make the relationship between the density of the original image and the density of the output image (i.e., tone characteristics between the original image and the output image) shown in the quadrant IV linear. The LUT 211 can be easily generated on the basis of the input-output characteristics of the printing unit shown the quadrant III.

Next at step S105, a test print P2 is outputted. A predetermined pattern image (test pattern image I2) on the test print P2 was also registered in the ROM 213 in advance, similarly to the test pattern image I1, and after the same processes performed on the test pattern image I1 by using the pattern generator 215 are applied to the test pattern image I2, the test print P2 as shown in FIG. 8 is outputted. Note, the test print P2 is outputted without using the LUT 211.

The test pattern image I2 is formed of patches of each color, Y, M, C and Bk, and each patch shows gradually changing 64 tones arranged in four rows and sixteen columns. Among reproducible 256 tones, the relatively large number of the low density tones are printed as a part of the 64 tones. By doing so, it is possible to adjust tone characteristics of a light color.

In FIG. 8, reference numeral 71 denotes patches printed in a resolution of 200 lpi (lines/inch), and 72 denotes patches printed in a resolution of 400 lpi. For forming images in these different resolutions, a plurality of triangular waves, used for converting image data by the PWM 212, having different periods are prepared. Note, the image forming apparatus forms a tone image in the resolution of 200 lpi, and forms a line image, such as a character, in the resolution of 400 lpi. Further, the image forming apparatus outputs two sets of patches in the two different resolutions by using the identical tone levels. However, in the case where the tone characteristics of the two sets of patches outputted on the test print P2 are much different depending upon the resolutions, the 64 tone levels to be outputted are preferably set depending upon the resolution.

Note, the output test print P2 is read by the reading unit similarly to the case of the maximum density correction processing, and the density values are corrected.

After the reading unit reads the test print P2 and the density values are corrected, the relationship between the laser output levels and the densities is stored in RAM 216 in correspondence to the laser output levels and tone pattern formation positions (step S106).

Accordingly, characteristics of the printing unit shown in the quadrant III in FIG. 7 are obtained. Then, by updating the input-output relationship of the characteristics of the printing unit, i.e., by exchanging the ordinate and the abscissa of the input-output characteristics, data to be set in the LUT 211 in the printing unit is obtained and set to the LUT 211 (step S107).

The data set to the LUT 211 in step S107 is used in the subsequent normal printing operation as parameters when forming an image by the image forming apparatus.

Note, when obtaining input-output characteristics data, to set LUT 211, of the printing unit by calculation, the density data which can be used is based only on the tones in the test pattern image I2, namely 64 tones, as shown in FIG. 8. Therefore, missing data is interpolated so that the laser output levels correspond to all the levels (tones), from 0 to 255, of the density signals.

After the aforesaid processes are completed, a message, such as "ready for copying", is displayed on an operation panel (not shown), for example, and the apparatus is ready for a copying operation.

By performing the aforesaid processes, as the contrast potential calculated in the method as described above is set as well as the data is set to the LUT 211, stable tone reproduction of an image on a recording medium is realized in the subsequent normal copying operation. Further, the image forming apparatus having good and linear toning characteristics with respect to image density signals can be obtained.

(Correction Control of Output Characteristics via the Bidirectional Communication)

Next, a method of compensating output characteristics of output devices (printers) of image forming apparatuses having the aforesaid self-adjusting function via bidirectional communication with a platform (computer) is explained.

Figure 9B:
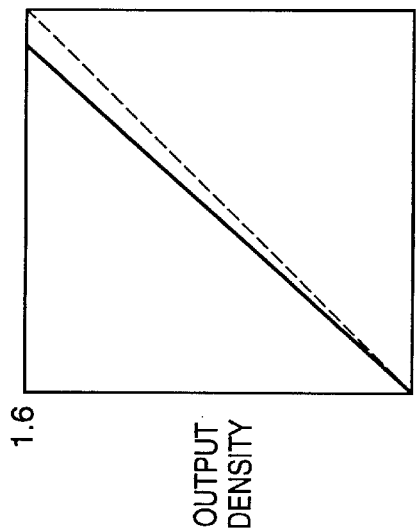
FIG. 9B is a graph showing input-output characteristics of a printer A.
Figure 9C:
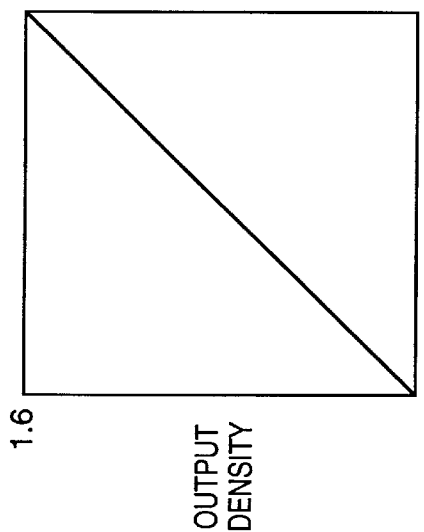
FIG. 9C is a graph showing input-output characteristics of a printer B.
Figure 9A:
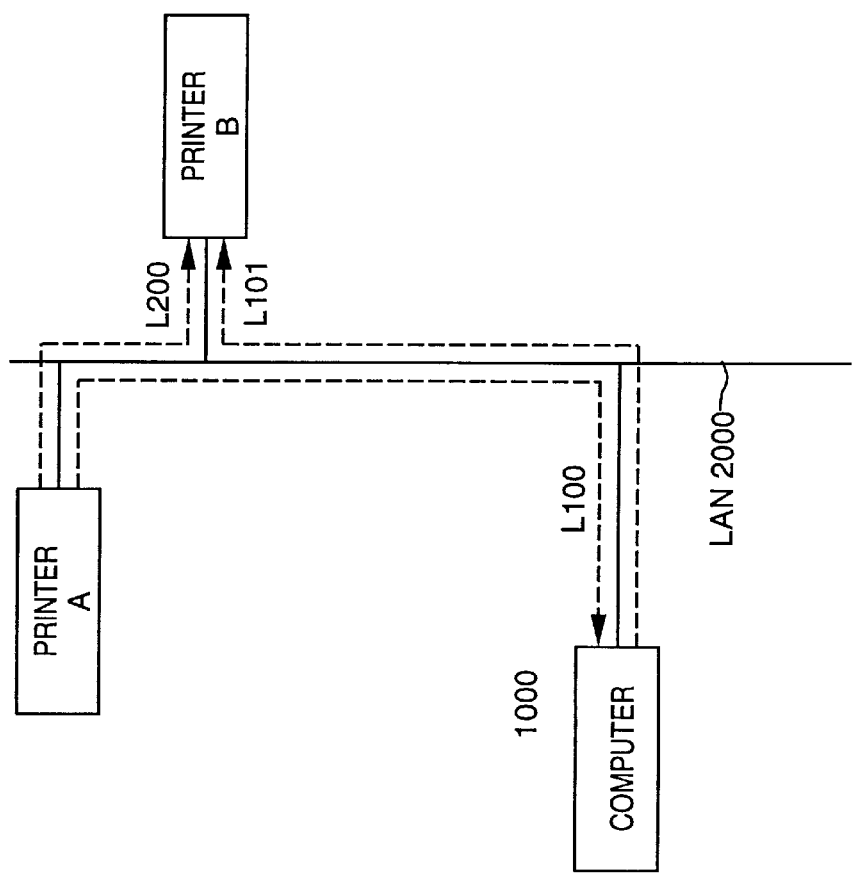
FIG. 9A is a schematic representation showing a system including a computer and a plurality of printers connected via., a communication network.

FIG. 9A is a schematic representation showing a system including a computer and a plurality of printers as copying machines (aforesaid image forming apparatuses) connected via a communication network system. In FIG. 9A, a computer 1000 is connected to a printer A and a printer B via a local area network (LAN) 2000 as communication means. Further, input-output characteristics (i.e., toning characteristics represented in the quadrant IV in FIG. 7) of the printer A and that of the printer B differ from each other. In such case, in order to adjust the input-output characteristics of a printer (printer B) to that of the printer A, input-output characteristic setting values (correspond to the content of data set in the LUT 211, signal L200) are transmitted from the printer A to the printer B. Or, the input-output characteristic setting values (signal L100) are received by the computer 1000, then they (signal L101) are transferred to the printer B for changing the input-output characteristics of the printer B, then the received input-output characteristic setting values are used in processing of input-output characteristic compensation in the printer B.

According to the first embodiment as described above, correction values of image forming parameters used in an output device are generated on the basis of the density values of test prints, and transmitted to other image forming apparatus via an external device (e.g., computer), or directly transmitted to another image forming apparatus. Accordingly, substantially the same reproduction quality of an image is achieved even when different output devices are used.

Further, by setting output characteristics from the computer 1000 as a user desires, it is possible to achieve the same advantages.

Further, by transmitting the adjusting value, such as the F value of each color, set by a user for each printer directly to another printer or via the computer 1000, it is possible to substantially obtain the same image reproduction quality when an image is outputted from different printers or copying machines.

Note, by providing means for independently switching the settings of the output characteristics in a printer, it is possible to substantially realize the same image reproduction quality as a user desires by using a printer originally having the different output characteristics with a simple operation.

<Second Embodiment>

A second embodiment of the present invention is described below. In the second embodiment, a case where each printer performs maximum density correction processing and tone correction processing by itself is explained. Note, an image forming-apparatus according to the second embodiment has the same configuration as that described in the first embodiment, therefore, explanation of it is omitted.

FIG. 10 illustrates a configuration of a processing circuit for processing signals from the photosensor 13 having an LED and a photodiode provided at a position facing the electrostatic drum 1. Near infrared rays reflected by the electrostatic drum 1 impinges on a photosensor 13 in FIG. 10 and is converted to electrical signals by the photosensor 13. Output voltage of each electrical signal which is between 0V and 5V is converted into a digital signal of between 0 to 255 levels by an analog-digital (A/D) converter 221, and is then converted into density data by a density converting circuit 222 provided in the downstream of the A/D converter 221.

Color toners, i.e., yellow, magenta and cyan toners, used in the image forming apparatus according to the second embodiment are compounds of styrene resin as a binder and color material of each color distributed in the binder. Spectral characteristics of these yellow, magenta and cyan toners (see FIGS. 14 through 17) are such that the reflectance of a near infrared ray (960 nm) is about 80%. Further, since carbon black is used as color material for expressing pure black, the reflectance of a near infrared ray is about 10%. Further, OPC is used in the electrostatic drum 1, and its reflectance of a near infrared ray is about 40%. Other drums, such as one using amorphous silicon, may be used since the reflectance is about the same.

Figure 18:
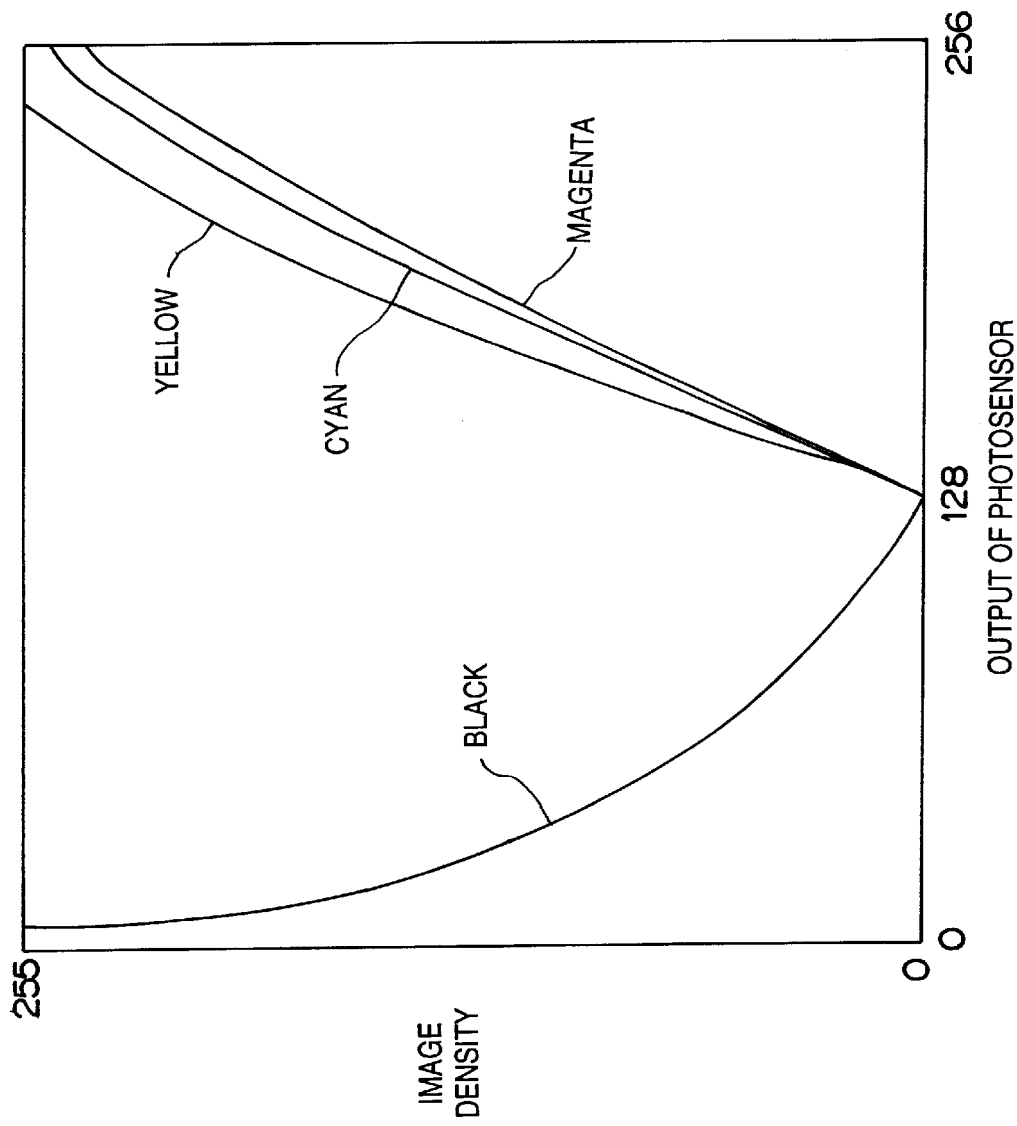
FIG. 18 is a graph showing the relationship between the output from the photosensor and the density of an image outputted on an electrostatic drum.

FIG. 18 is a graph showing the relationship between the output from the photosensor 13 and density of an image outputted on the electrostatic drum 1 when the density of each color toner on the electrostatic drum is stepwise changed by area toning. Here, as shown in FIG. 18, the output of the photosensor 13 when no toner is clinging to the electrostatic drum 1 is set to 2.5 V, namely, the $128^{th}$ level.

As seen from FIG. 18, for the yellow, magenta and cyan toners, as area covering rate, namely an amount of toner used per unit area, becomes larger and as the density of an image becomes higher, the output of the photosensor 13 increases compared to when no toner is clinging to the electrostatic drum 1.

In contrast, the black toner, as the area covering rate becomes larger and as the density of an image becomes higher, the output of the photosensor 13 decreases compared to when no toner is clinging to the electrostatic drum 1. Therefore, a table 223, made in consideration of the aforesaid characteristics, for converting an output signal of the photosensor 13 into a density signal is provided. Accordingly, it is possible to obtain a density signal for each color in correspondence with the state of the electrostatic drum 1.

(Maximum Density Correction Processing and Tone Correction Processing)

According to the second embodiment, on the basis of density signals obtained by the aforesaid processing circuit, the contrast potential Vcont for each color, M, C, Y and Bk, is calculated and the LUT 211 is made for each color, and the maximum density correction processing and the tone correction processing, similarly to those explained in the first embodiment, are performed.

Figure 11:
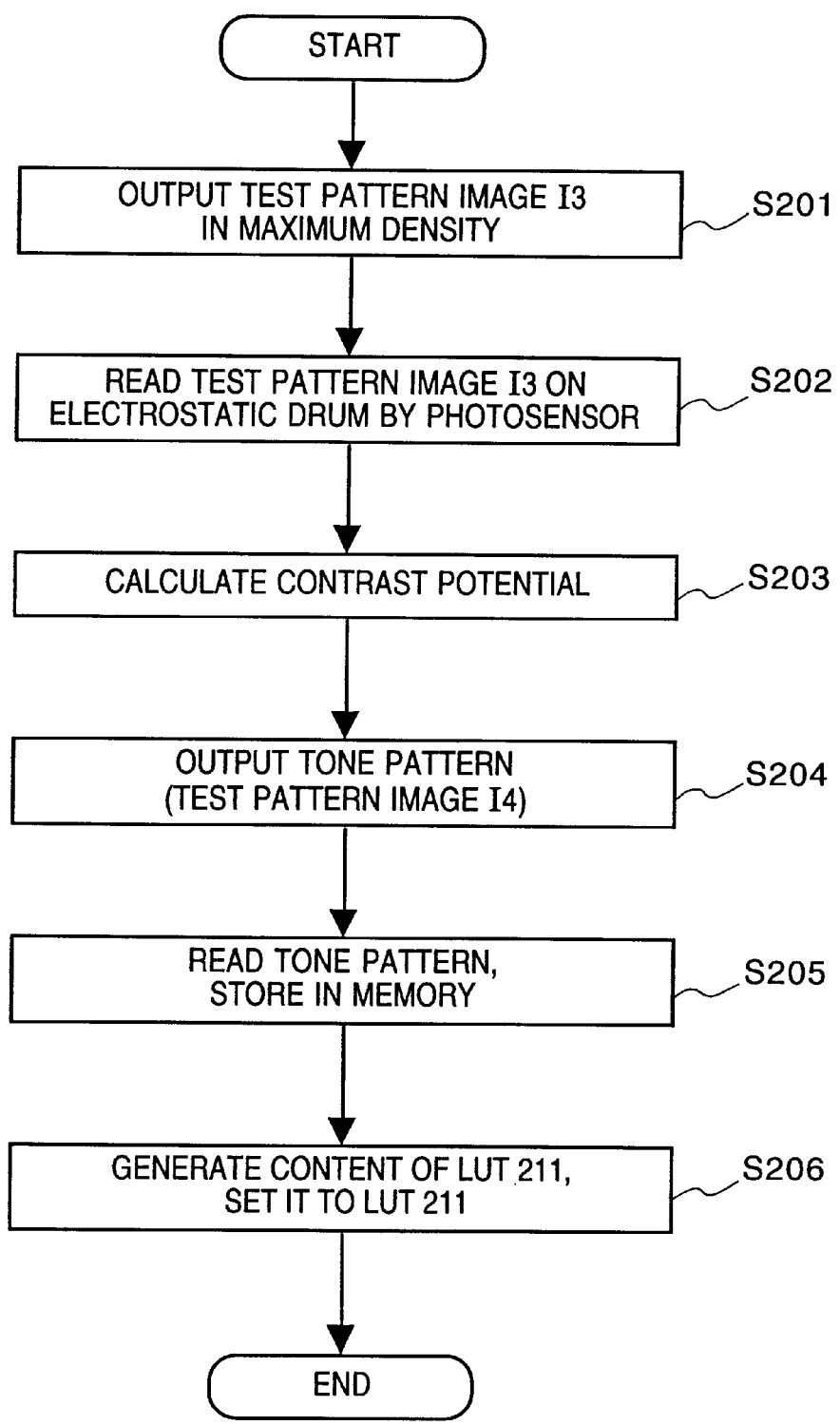
FIG. 11 is a flowchart showing a processing sequence of maximum density correction and tone correction when using the photosensor according to the second embodiment.

FIG. 11 is a flowchart showing a processing sequence of the maximum density correction processing and the tone correction processing using a photosensor according to the second embodiment.

First, maximum density correction processing is explained.

Figure 12A:
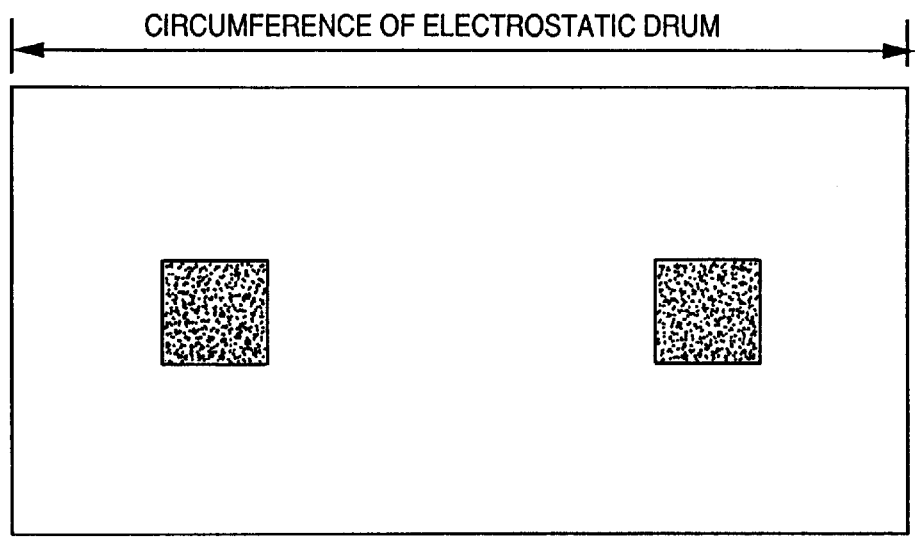
FIG. 12A is a view showing a patch pattern outputted from a pattern generator.

Similarly to the first embodiment as described above, after the potential measuring control for measuring the grid potential and the potential of the developing bias is performed, a patch pattern image of the maximum density (test pattern image I3), as shown in FIG. 12A, is generated by the pattern generator 215 for the maximum density correction processing and formed on the electrostatic drum 1 (step S201). The test pattern image I3 and a test pattern image I4, which will be explained later, were registered in the ROM 213 in advance, similarly to the case explained in the first embodiment, and the pattern generator 215 generates image signals corresponding to the pattern image under control of the CPU 214. Then, reflected light from the patch pattern image I3 on the electrostatic drum 1 is detected by the photosensor 13 (step S202), the obtained result is converted into density by the density converting circuit 222 and a contrast potential for each color is set so that the maximum density becomes 0.1 higher than a predetermined desired value (step S203).

Figure 12B:
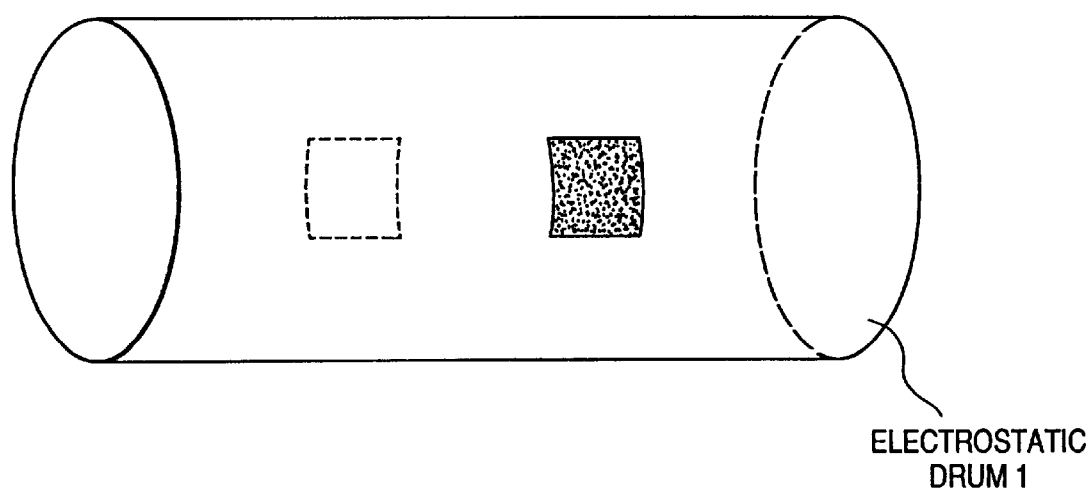
FIG. 12B is a view showing the patch pattern shown in FIG. 12A developed on an electrostatic drum.

Note, in the second embodiment, an electrostatic drum of large caliber is used in the printing unit. Therefore, for obtaining precise density data, decentering of the rotation axis of the electrostatic drum 1 is considered, and patches of the same color are formed in the opposite positions with respect to the rotation axis on the electrostatic drum 1, and predetermined measurement and a plurality of sampling operations are performed, and the obtained results are averaged. Note, FIG. 12B shows patch patterns shown in FIG. 12A when they are developed on the electrostatic drum 1.

Next, the tone correction processing is explained.

Figure 13A:
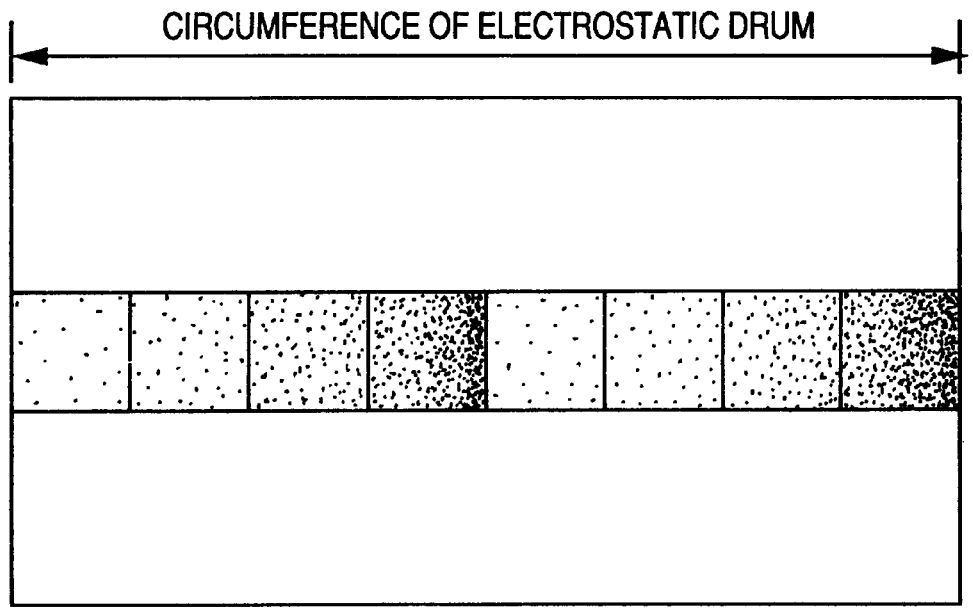
FIG. 13A is a view showing another patch pattern outputted from the pattern generator.
Figure 13B:
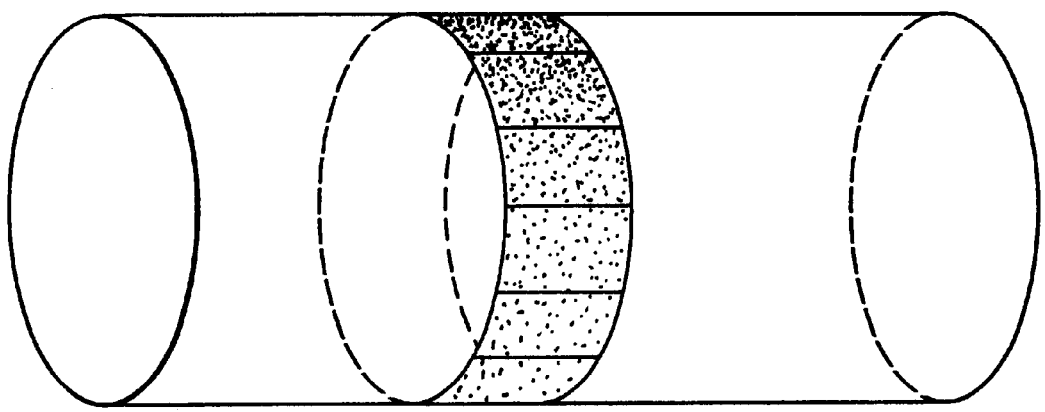
FIG. 13B is a view showing the patch pattern shown in FIG. 13A developed on the electrostatic drum.
Figure 16:
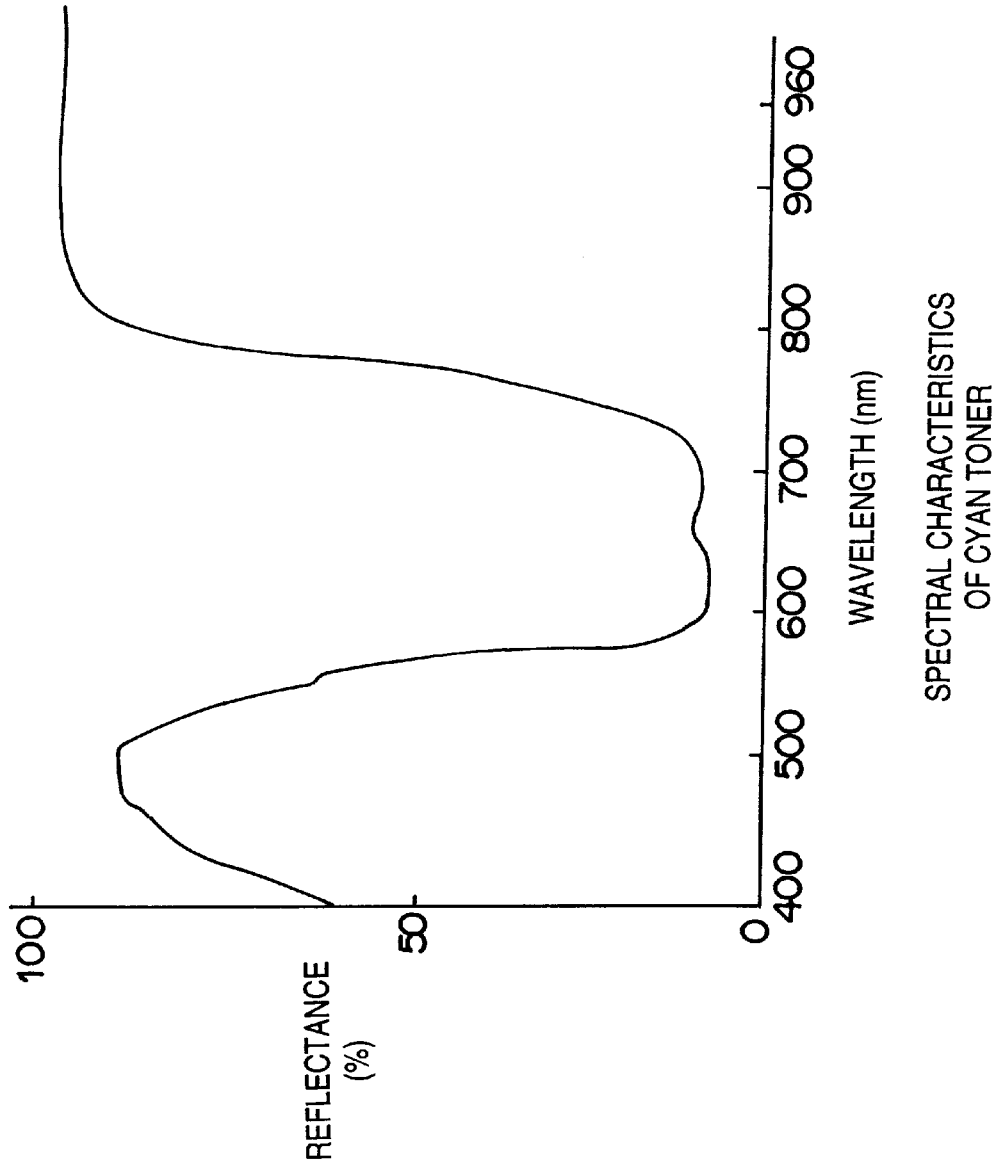
FIG. 16 is a graph showing spectral characteristics of a cyan toner.
Figure 17:
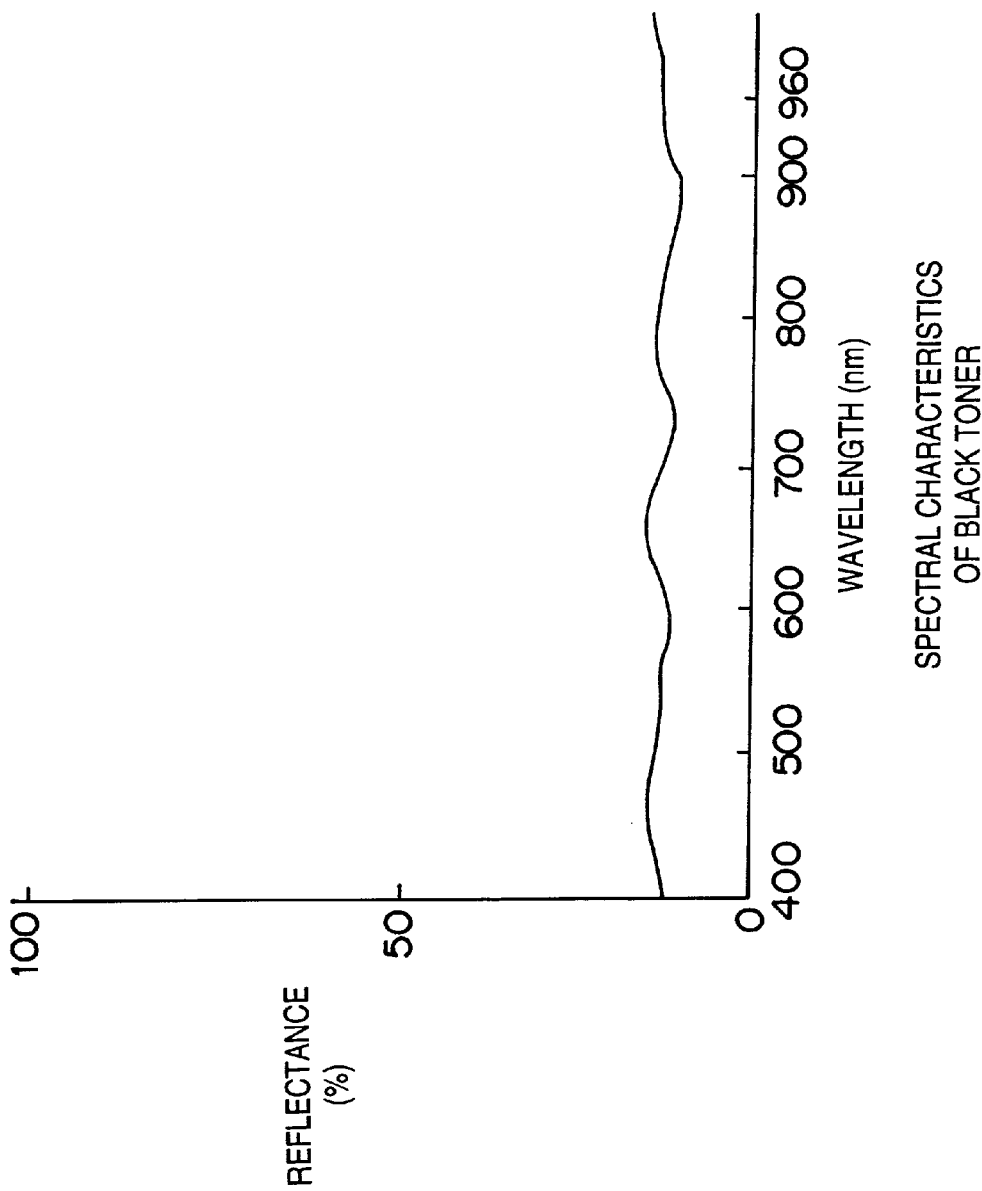
FIG. 17 is a graph showing spectral chracteristics of a black toner.

In the second embodiment, a tone pattern (test pattern image I4) is formed on the electrostatic drum 1 (step S204). FIG. 13A shows the tone pattern (test pattern image I4) of each color generated by the pattern generator 215. Further, FIG. 13B shows the tone pattern shown in FIG. 13A when it is developed on the electrostatic drum 1 (step S204). After reflected light from the patch pattern image I4 on the electrostatic drum 1 is detected by the photosensor 13 (step S202), the obtained result is converted to density by the density converting circuit 222, and the relationship between the laser output level and the obtained density are stored in the RAM 216 (step S205). Thereafter, on the basis of the relationship between the laser output level and the density, the content of the LUT 211 for each color is determined and set (step S206).

(Correction Control of Output Characteristics via the Bidirectional Communication)

Next, a method of compensating output characteristics of output devices (printers) of image forming apparatuses having the aforesaid self-adjusting function via bidirectional communication with a platform (computer) is explained.

In the second embodiment, assume that the input-output characteristics (toning characteristics in the quadrant IV in FIG. 7) of the printer A and those of the printer B, shown in FIG. 9, differ. In such case, in order to adjust the input-output characteristics of a printer (printer B) to the output characteristics of the printer A, input-output characteristic setting values (correspond to the content of data set in the LUT 211) of the printer A is directly transmitted to the printer B, or a computer receives the input-output characteristic setting values of the printer A, then transmits them to the printer B for changing the input-output characteristics of the printer B. The printer B uses the received input-output characteristic setting values for correcting the input-output characteristics of itself.

By performing as described above, it is possible to provide substantially identical image reproductivity when different output devices are used according to the second embodiment.

It should be noted that output characteristics may be set by a user to desired ones via a computer. Similarly, it is possible to change the maximum density to the desired value. Furthermore, the predetermined pattern images may be formed on a recording paper sheet as in the first embodiment, or may be formed on a medium, such as an electrostatic drum and a transfer drum, as in the second embodiment.

Further, by transmitting an adjusting value, such as the F value of each color, set by a user for each printer to another printer directly or via a computer, it is possible to obtain substantially the same image reproduction quality when an image is outputted from different printers or copying machines.

Note, by providing means for independently switching the settings of the output characteristics in a printer, it is possible to realize substantially the same image reproduction quality as a user desires by using a printer originally having different output characteristics with a simple operation.

The present invention can be applied to a system constituted by a plurality of devices (e.g., host computer, interface, reader, and printer) or to an apparatus comprising a single device (e.g., copying machine and facsimile machine). Furthermore, the invention is applicable also to a case where the object of the invention is attained by supplying a program to a system or apparatus.

According to the embodiments as described above, image forming parameters representing reproduction characteristics of an image of an output device of the apparatus are generated on the basis of densities of pattern images formed on a recording medium, and the generated parameters are transmitted to other image forming apparatus by communication. Accordingly, even when a plurality of image forming apparatuses are used, γ characteristics of output devices are corrected to desired ones, thereby a difference in output characteristics between the image forming apparatuses is reduced.

The present invention is not limited to the above embodiments and various changes and modifications can be made within the spirit and scope of the present invention. Therefore to appraise the public of the scope of the present invention, the following claims are made.

What is claimed is:

1. An image processing apparatus for adjusting a color process condition to be applied to a first color image forming apparatus for forming a color image on a medium by using image forming means, said processing apparatus comprising:

setting means for setting an image forming condition in accordance with a detected result of a first pattern image formed by said image forming means; and transmitting means for transmitting, to an external device, information according to a detected result of a second pattern image formed by said image forming means which is controlled by the image forming condition and an adjusting value set by a user, wherein the external device adjusts a color process condition of a second color image forming apparatus, which is different from the first color image forming apparatus, on a basis of the transmitted information and the transmitted adjusting value.

2. The image processing apparatus according to claim 1, wherein the second pattern image is a tone pattern image, and the information represents a condition of tone conversion.

3. The image processing apparatus according to claim 2, wherein the condition of tone conversion is generated by an interpolation operation.

4. The image processing apparatus according to claim 2, wherein the condition of tone conversion is data of a look-up table.

5. The image processing apparatus according to claim 1, wherein said transmitting means transmits the information and also a user adjusted value arbitrarily set by a user.

6. The image processing apparatus according to claim 1, wherein the medium is recording paper.

7. The image processing apparatus according to claim 1, wherein said transmitting means performs bidirectional communication with the external device.

8. The image processing apparatus according to claim 7, wherein the external device is an image processing apparatus for the second color image forming apparatus.

9. The image processing apparatus according to claim 1, further comprising a scanner for scanning an original image.

10. The image processing apparatus according to claim 1, wherein the transmitted adjusting value is a F-value of each color.

11. The image processing apparatus according to claim 1, wherein the image forming condition is a condition regarding a contrast potential.

12. The image processing apparatus according to claim 1, wherein the first pattern image and the second pattern image are formed on the medium.

13. The image processing apparatus according to claim 1, wherein the first pattern image is formed on an electrostatic drum.

14. A color process condition adjusting method of an image processing apparatus, said method comprising:

a setting step of setting an image forming condition in accordance with a detected result of a first pattern image formed by image forming means of a first color image forming apparatus which forms a color image on a medium by using said image forming means;

a transmitting step of transmitting, to an external device, information according to a detected result of a second pattern image formed by said image forming means which is controlled by the image forming condition and an adjusting value set by a user; and an adjusting step of adjusting, in the external device, a color process condition of a second color image forming apparatus, which is different from the first color image forming apparatus, on a basis of the transmitted information and the transmitted adjusting value.

15. The color process condition adjusting method according to claim 14, wherein the second pattern image is a tone pattern image, and the information represents a condition of tone conversion.

16. The color process condition adjusting method according to claim 15, wherein the condition of tone conversion is generated by an interpolation operation.

17. The color process condition adjusting method according to claim 15, wherein the condition of tone conversion is data of a look-up table.

18. The color process condition adjusting method according to claim 14, wherein said transmitting means transmits the information and also a user adjusted value arbitrarily set by a user.

19. The color process condition adjusting method according to claims 14, wherein the medium is recording paper.

20. The color process condition adjusting method according to claim 14, wherein in said transmitting step, bidirectional communication is performed with the external device.

21. The color process condition adjusting method according to claim 20, wherein the external device is an image processing apparatus for the second color image forming apparatus.

22. An image processing method of adjusting a color process condition of a second image outputting device having second image forming means in accordance with an adjusting result of a first image outputting device having a first image forming means, said method comprising:

a setting step of setting an image forming condition, of the first image outputting device, in accordance with a detected result of a first pattern image formed by said first image forming means;

an inputting step of inputting information according to a detected result of a second pattern image formed by said first image forming means which is controlled by the image forming condition and an adjusting value set by a user; and an adjusting step of adjusting a color process condition of the second image outputting device on a basis of the inputted information and the inputted adjusting value.

23. The image processing method according to claim 22, wherein the second pattern image is a tone pattern image, and the inputted information represents a condition of tone conversion.

24. The image processing method according to claim 23, wherein the condition of tone conversion is data of a look-up table.

25. The image processing method according to claim 13, wherein the inputted adjusting value is a F-value of each color regarding the first image outputting device.

* * * * *

UNITED STATES PATENT AND TRADEMARK OFFICE
CERTIFICATE OF CORRECTION

PATENT NO. : 6,184,915 B1
DATED : February 6, 2001
INVENTOR(S) : Tetsuya Atsumi et al.

It is certified that error appears in the above-identified patent and that said Letters Patent is hereby corrected as shown below:

Title page,
Item [54], the Title "IMAGE PROCESSING APPARATUS AND METHOD" should read -- IMAGE PROCESSING APPARATUS AND METHOD HAVING A FUNCTION FOR COMPENSATING FOR CHARACTERISTICS OF AN OUTPUT DEVICE --.
Item [56] References Cited, in U.S. PATENT DOCUMENTS,
-- 5,748,342    5/1998         Akihiro Usami ......... 358/500 -- should be inserted.

Column 1,
Lines 1-3, the Title, "IMAGE PROCESSING APPARATUS AND METHOD" should read -- IMAGE PROCESSING APPARATUS AND METHOD HAVING A FUNCTION FOR COMPENSATING FOR CHARACTERISTICS OF AN OUTPUT DEVICE --.
Line 29, "-And" should read -- and --;
Line 44, "adjusted" should read -- adjust --; and
Line 49, "other." should read -- another. --.

Column 2,
Line 62, "via.," should read -- via --.

Column 4,
Line 18, "as" should read -- to as --.

Column 5,
Line 19, "211" should read -- 211 is used --.

Column 9,
Line 49, "the" should read -- a --;
Line 54, "200 lpi" should read -- 200lpi --;
Line 55, "400 lpi." should read -- 400lpi. --;
Line 59, "200 lpi," should read -- 200lpi, --; and
Line 61, "400 lpi." should read -- 400lpi. --.

UNITED STATES PATENT AND TRADEMARK OFFICE
CERTIFICATE OF CORRECTION

PATENT NO. : 6,184,915 B1
DATED : February 6, 2001
INVENTOR(S) : Tetsuya Atsumi et al.

It is certified that error appears in the above-identified patent and that said Letters Patent is hereby corrected as shown below:

Column 15,
Line 21, "claims" should read -- claim --.

Column 16,
Line 25, "13," should read -- 23 --.

Signed and Sealed this

Fifth Day of March, 2002

Attest:

Attesting Officer

JAMES E. ROGAN
Director of the United States Patent and Trademark Office